(12) United States Patent
Horvitz et al.

(10) Patent No.: US 9,798,890 B2
(45) Date of Patent: Oct. 24, 2017

(54) ABSTRACTIONS AND AUTOMATION FOR ENHANCED SHARING AND COLLABORATION

(71) Applicant: Microsoft Technology Licensing, LLC, Redmond, WA (US)

(72) Inventors: Eric J. Horvitz, Kirkland, WA (US); Jonathan T. Grudin, Issaquah, WA (US); Prasun Dewan, Chapel Hill, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 14/792,464

(22) Filed: Jul. 6, 2015

(65) Prior Publication Data
US 2015/0310224 A1    Oct. 29, 2015

Related U.S. Application Data

(63) Continuation of application No. 13/033,409, filed on Feb. 23, 2011, now Pat. No. 9,076,128, which is a
(Continued)

(51) Int. Cl.
*H04L 21/00* (2006.01)
*G06F 21/62* (2013.01)
*G06Q 10/10* (2012.01)

(52) U.S. Cl.
CPC ......... *G06F 21/6218* (2013.01); *G06Q 10/10* (2013.01)

(58) Field of Classification Search
USPC .......................................................... 726/27
See application file for complete search history.

(56) References Cited

U.S. PATENT DOCUMENTS 5,493,692 A    2/1996 Theimer et al.
5,513,126 A    4/1996 Harkins et al.
(Continued)

FOREIGN PATENT DOCUMENTS

WO    9800787 A1    1/1998

OTHER PUBLICATIONS

"Final Office Action Issued in U.S. Appl. No. 10/827,732", Mailed Date: Nov. 10, 2009, 29 Pages.
(Continued)

*Primary Examiner* — Jeffery Williams
(74) *Attorney, Agent, or Firm* — Wade IP Law LLC

(57) ABSTRACT

The present invention provides methods for using abstractions of people, including dynamic and static groups of people, to enhance the efficiency of the specification and automation of policies for sharing information between users with a "need-to-know." An instance of the present invention can also provide these users information based on a "time-to-know." By providing access to information based on group affiliation and properties of the content of the information, the present invention maintains optimal information privacy while minimizing encumbrances to sharing data with appropriate users and even at appropriate times. The present invention can be integrated with other communication technologies to facilitate access to information in a time appropriate manner. Other instances of the present invention employ automated and semi-automated, mixed-initiative techniques, to make information-sharing decisions. Additional instances of the present invention include the employment of machine-learning techniques to facilitate construction of access policies from the actions or profile of a single user or a community of users, including the construction of automated sharing agents that work in an
(Continued)

automated or mixed-initiative manner to respond to real-time requests for information.

20 Claims, 20 Drawing Sheets

Related U.S. Application Data continuation of application No. 10/827,732, filed on Apr. 20, 2004, now Pat. No. 7,908,663.

(56) References Cited

U.S. PATENT DOCUMENTS

| | | | |
|---|---|---|---|
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,704,017 A | 12/1997 | Heckerman et al. | |
| 5,812,865 A | 9/1998 | Theimer et al. | |
| 6,105,027 A * | 8/2000 | Schneider | H04L 63/0218 |
| 6,275,825 B1 | 8/2001 | Kobayashi et al. | |
| 6,308,274 B1 * | 10/2001 | Swift | G06F 21/604 |
| | | | 710/200 |
| 6,314,420 B1 | 11/2001 | Lang et al. | |
| 6,353,398 B1 | 3/2002 | Amin et al. | |
| 6,366,913 B1 | 4/2002 | Steinback et al. | |
| 6,370,629 B1 | 4/2002 | Hastings et al. | |
| 6,421,655 B1 | 7/2002 | Horvitz et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,591,265 B1 | 7/2003 | Erickson et al. | |
| 6,647,388 B2 | 11/2003 | Numao et al. | |
| 6,671,695 B2 | 12/2003 | McFadden | |
| 6,672,506 B2 | 1/2004 | Swartz et al. | |
| 6,697,840 B1 | 2/2004 | Godefroid et al. | |
| 6,741,188 B1 | 5/2004 | Miller et al. | |
| 6,747,675 B1 | 6/2004 | Abbott et al. | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,837,436 B2 | 1/2005 | Swartz et al. | |
| 6,842,877 B2 | 1/2005 | Robarts et al. | |
| 6,944,619 B2 | 9/2005 | Gruenwald | |
| 6,968,179 B1 | 11/2005 | De Vries | |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,085,834 B2 | 8/2006 | Delany et al. | |
| 7,120,635 B2 | 10/2006 | Bhide et al. | |
| 7,143,091 B2 | 11/2006 | Charnock et al. | |
| 7,171,378 B2 | 1/2007 | Petrovich et al. | |
| 7,195,157 B2 | 3/2007 | Swartz et al. | |
| 7,228,561 B2 | 6/2007 | Sameshima et al. | |
| 7,336,790 B1 | 2/2008 | Caronni et al. | |
| 7,385,501 B2 | 6/2008 | Miller et al. | |
| 7,636,725 B2 | 12/2009 | Delaney et al. | |
| 7,725,490 B2 | 5/2010 | Hitchen et al. | |
| 8,015,301 B2 | 9/2011 | Carter et al. | |
| 9,076,128 B2 * | 7/2015 | Horvitz | G06F 21/6218 |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2001/0051876 A1 | 12/2001 | Seigel et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0095524 A1 | 7/2002 | Sanghvi et al. | |
| 2002/0099817 A1 | 7/2002 | Abbott et al. | |
| 2002/0138572 A1 * | 9/2002 | Delany | G06F 21/41 |
| | | | 709/204 |
| 2002/0138763 A1 * | 9/2002 | Delany | G06F 21/41 |
| | | | 726/6 |
| 2002/0143961 A1 | 10/2002 | Siegel et al. | |
| 2002/0147509 A1 | 10/2002 | Sameshima et al. | |
| 2002/0161862 A1 | 10/2002 | Horvitz | |
| 2002/0174199 A1 | 11/2002 | Horvitz | |
| 2002/0178271 A1 | 11/2002 | Graham et al. | |
| 2002/0184211 A1 | 12/2002 | Gruenwald | |
| 2003/0046401 A1 | 3/2003 | Abbott et al. | |
| 2003/0083086 A1 | 5/2003 | Toyryla et al. | |
| 2003/0105734 A1 * | 6/2003 | Hitchen | G06F 21/10 |
| 2003/0126137 A1 | 7/2003 | McFadden | |
| 2003/0154476 A1 | 8/2003 | Abbott, III et al. | |
| 2003/0217122 A1 | 11/2003 | Roese et al. | |
| 2004/0117371 A1 | 6/2004 | Bhide et al. | |
| 2004/0193459 A1 | 9/2004 | Delaney et al. | |
| 2004/0201500 A1 | 10/2004 | Miller et al. | |
| 2005/0027837 A1 | 2/2005 | Roese et al. | |
| 2005/0034078 A1 | 2/2005 | Abbott et al. | |
| 2005/0068983 A1 * | 3/2005 | Carter | H04L 63/102 |
| | | | 370/480 |
| 2005/0120199 A1 | 6/2005 | Carter | |
| 2005/0209914 A1 | 9/2005 | Nguyen et al. | |
| 2005/0259654 A1 | 11/2005 | Faulk | |
| 2005/0266858 A1 | 12/2005 | Miller et al. | |
| 2005/0272442 A1 | 12/2005 | Miller et al. | |
| 2006/0019676 A1 | 1/2006 | Miller et al. | |
| 2008/0090591 A1 | 4/2008 | Miller et al. | |
| 2008/0091537 A1 | 4/2008 | Miller et al. | |
| 2008/0134069 A1 | 6/2008 | Horvitz | |
| 2008/0140776 A1 | 6/2008 | Horvitz | |
| 2008/0161018 A1 | 7/2008 | Miller et al. | |

OTHER PUBLICATIONS

"Final Office Action Issued in U.S. Appl. No. 10/827,732", Mailed Date: Sep. 16, 2010, 29 Pages.
"Final Office Action Issued in U.S. Appl. No. 10/827,732", Mailed Date: Dec. 10, 2008, 33 Pages.
"Non-Final Office Action Issued in U.S. Appl. No. 10/827,732", Mailed Date: Nov. 27, 2007, 28 Pages.
"Non-Final Office Action Issued in U.S. Appl. No. 10/827,732", Mailed Date: Apr. 2, 2009, 29 Pages.
"Non-Final Office Action Issued in U.S. Appl. No. 10/827,732", Mailed Date: Apr. 2, 2010, 30 Pages.
"Non-Final Office Action Issued in U.S. Appl. No. 10/827,732", Mailed Date: Jun. 9, 2008, 34 Pages.
"Notice of Allowance Issued in U.S. Appl. No. 10/827,732", Mailed Date: Nov. 5, 2010, 9 Pages.
"Final Office Action Issued in U.S. Appl. No. 13/033,409", Mailed Date: Nov. 14, 2012, 20 Pages.
"Final Office Action Issued in U.S. Appl. No. 13/033,409", Mailed Date: Jan. 30, 2014, 21 Pages.
"Non-Final Office Action Issued in U.S. Appl. No. 13/033,409", Mailed Date: Jul. 30, 2013, 22 Pages.
"Non-Final Office Action Issued in U.S. Appl. No. 13/033,409", Mailed Date: May 23, 2012, 22 Pages.
"Notice of Allowance Issued in U.S. Appl. No. 13/033,409", Mailed Date: Mar. 3, 2015, 5 Pages.
"Notice of Allowance Issued in U.S. Appl. No. 13/033,409", Mailed Date: Nov. 24, 2014, 5 Pages.
"Workshop on Wearable Computing Systems", Retrieved on: Jul. 4, 2005, 3 pages, Available at: http://wearcam.org/computing/workshop/schedule.html.
Billinghurst, et al., "An Evaluation of Wearable Information Spaces", In Proceedings of the Virtual Reality Annual International Symposium, Mar. 1998, 8 Pages.

(56) References Cited

OTHER PUBLICATIONS

Billinghurst, et al., "Wearable Devices: New Ways to Manage Information", In Proceedings of the IEEE Computer Society, Jan. 1999, vol. 32, Issue 1, pp. 57-64.
Billinghurst, Mark, "Research Directions in Wearable Computing", Retrieved on: Apr. 4, 2005, 48 pages, Available at: http://web.archive.org/web/20001209222300/http://www.hitl.washington.edu/consortium/mark598/sld048.htm.
Chen, et al., "A Survey of Context-Aware Mobile Computing Research", In Technical Report TR2000-381, Dept. of Computer Science, vol. 1, Issue 2, Nov., 2000, 16 Pages.
Harter, et al., "A Distributed Location System for the Active Office", In Proceedings of the IEEE Network, Issue 1, Jan. 1994, pp. 62-70.
Horvitz, et al., "Attention-Sensitive Alerting in Computing Systems", In Proceedings of the Conference on Uncertainty in Artificial Intelligence, Aug. 1999, pp. 305-313.
Horvitz, et al., "In Pursuit of Effective Handsfree Decision Support: Coupling Bayesian Inference, Speech Understanding, and User Models", In Proceedings of the Nineteenth Annual Symposium on Computer Applications in Medical Care, Toward Cost-Effective Clinical Computing, 1995, 8 Pages.
Horvitz, Eric, "Principles of Mixed-Initiative User Interfaces", In Proceedings of the SIGCHI conference on Human Factors in Computing Systems, May 1999, pp. 159-166.
Joachims, Thorsten, "Text Categorization with Support Vector Machines: Learning with Many Relevant Features", In Proceedings of the European Conference on Machine Learning, Apr. 21, 1998, pp. 137-142.
Satyanarayanan, et al., "Coda: A Highly Available File System for a Distributed Workstation Environment", In Proceedings of the IEEE Transactions on Computers, vol. 39, Issue 4, Nov. 2, 2007, pp. 447-459.
Rhodes, et al., "Remembrance Agent: A Continuously Running Automated Information Retrieval System", In Proceedings of the First International Conference on the Practical Application of Intelligent Agents and Multi Agent Technology, Apr. 1996, 8 Pages.
Rhodes, Bradley J., "The Wearable Remembrance Agent: A System for Augmented Theory", In Proceedings of the International Symposium on Wearable Computers, Oct. 13, 1997, pp. 123-128.
Losee Robert M., "Minimizing Information Overload: the Ranking of Electronic Messages", In Journal of Information Science, vol. 15, Issue 3, Jul. 18, 1988, pp. 179-189.
Schilit, et al., "Context-Aware Computing Applications", In Proceedings of the Workshop on Mobile Computing Systems and Applications, Dec. 1994, pp. 85-90.
Schilit, et al., "Customizing Mobile Applications", In Proceedings USENIX Symposium on Mobile and Location Independent Computing, Aug. 1993, 9 Pages.
Schilit, "Disseminating Active Map Information to Mobile Hosts", In Proceedings of the IEEE Network, vol. 8, Issue 5, Sep. 1994, pp. 22-32.
Schilit, et al., "The ParcTab Mobile Computing System", In Proceedings of the Fourth Workshop on Workstation Operating Systems, Oct. 1993, 4 Pages.
Schilt, William N., "A System Architecture for Context-Aware Mobile Computing", A Thesis Submitted to the Columbia University in Partial Fulfillment of the Requirements for the Degree of Doctor of Philosophy in the Graduate School of Arts and Sciences, Dec. 1995, 153 Pages.
Spreitzer, et al., "Architectural Considerations for Scalable, Secure, Mobile Computing with Location Information", In Proceedings of the International Conference on Distributed Computing Systems, Jun. 1994, pp. 29-38.
Spreitzer, et al., "Providing Location Information in a Ubiquitous Computing Environment", In Proceedings of the Fourteenth ACM Symposium on Operating Systems Principles, Jan. 3, 1994, pp. 270-283.
Spreitzer, et al., "Scalable, Secure, Mobile Computing with Location Information", In Proceedings of the Communications of the ACM, vol. 36, Issue 7, Jul. 1993, 1 Page.
Starner, Eugene T., "Wearable Computing and Contextual Awareness", A Thesis Submitted to the Massachusetts Institute of Technology in Partial Fulfillment of the Requirements for the Degree of Doctor of Philosophy Media Arts and Sciences, School of Architecture and Planning, Jun. 1999, 248 Pages.
Theimer, et al., "Operating System Issues for PDAs", In Proceedings of the Fourth Workshop on Workstation Operating Systems, Oct. 1993, 7 Pages.
Want, et al., "Active Badges and Personal Interactive Computing Objects", In Proceedings of the IEEE Transactions on Consumer Electronics, vol. 38, Issue 1, Feb. 1992, 11 Pages.
Want, et al., "The Active Badge Location System", In proceedings of the ACM Transactions on Information Systems, vol. 10, Issue 1, Jan. 1992, pp. 91-102.
Weiser, Mark, "Some Computer Science Issues in Ubiquitous Computing", In Proceedings of the Communications of the ACM, vol. 36, Issue 7, Jul. 1993, pp. 75-84.
Weiser, Mark, "The Computer for the 21st Century", In Proceedings of the Scientific American, vol. 265, Issue 3, Sep. 1991, pp. 94-104.
"International Search Report & Written Opinion for PCT Application No. PCT/US00/20685", Mailed Date: Sep. 29, 2003, 3 Pages.
Rhodes, Bradley J., "The Wearable Remembrance Agent: A System for Augmented Memory", In Personal Technologies Journal, vol. 1, Issue 4, Dec. 1997, 12 Pages.

* cited by examiner

ABSTRACTIONS AND AUTOMATION FOR ENHANCED SHARING AND COLLABORATION

CROSS-REFERENCE TO RELATED APPLICATIONS

This Application is a continuation of U.S. patent application Ser. No. 13/033,409, entitled "ABSTRACTIONS AND AUTOMATION FOR ENHANCED SHARING AND COLLABORATION," filed on Feb. 23, 2011, which is herein incorporated by reference in its entirety. U.S. patent application Ser. No. 13/033,409 is a continuation of U.S. patent application Ser. No. 10/827,732, entitled "ABSTRACTIONS AND AUTOMATION FOR ENHANCED SHARING AND COLLABORATION," filed on Apr. 20, 2004, which is herein incorporated by reference in its entirety.

TECHNICAL FIELD

The present invention relates generally to data access, and more particularly to systems and methods for providing control of sharing and privacy of data for collaboration, including the selective sharing with others of the content of documents, messages, and software applications, and of such information as location, presence, availability, and activities.

BACKGROUND OF THE INVENTION

The proliferation of digital information has allowed vast amounts of data to be shared very easily from almost anywhere in the world. Connecting online with a computer allows a user to access almost unlimited amounts of information. This dissemination of data is often extremely useful, but at times can also pose problems. The fact that data can be so easily passed from place to place when desired also allows the data to pass from place to place even when not desired. Thus, a great deal of effort has been placed on curtailing the flow of data, permitting only desired data to be released and retaining private information. One way of controlling the information is to actually make the data harder to disseminate. Disconnecting a computer's physical connections, transferring data only via a separate media device, and encrypting information are a few of the ways to limit the flow of information. These techniques actually reverse the one benefit of having digital information—the ease of dissemination.

Often, a user would like to allow only certain users to access particular information. With the aforementioned techniques, this would require a significant amount of effort, time, and cost. For instance, if the user were disconnecting their computer to protect their data, they would have to coordinate with the other user for a specific time that a connection is to be made to allow access to the information. Encryption, as an access control, has similar deficiencies, namely requiring another user to previously obtain a cryptographic key in order to decode the information. This technique also requires that the information be encoded, increasing effort on both sides.

In both of these examples, a user essentially is opening up access to information to a user in an all or nothing approach. To actually control when and how a user accesses the data, further effort is required beyond that described. In the first instance, if the other user is an unknown user, the user with the information must spend time to determine if the unknown user should actually be allowed to access the information, even before a connection is made. In the second instance, if the other user already has a decryption key, the data can be accessed at any time, possibly not what the information user had intended. It is very common for users to constantly change their minds concerning when and what data should be made accessible and to whom.

The above techniques place an extreme burden on a user to protect their data. Frequently, users become frustrated by the costs and either open access to all other users or completely shut down access to anyone. If the information is of a personal nature on a home computer, this latter method might be acceptable to a user. However, if the user is an employee in a business environment, closing access to everyone is not acceptable. Thus, deliberating about the control of information is essential in effective collaboration with others in business, as well as in the arts, education, government, family communication, and many other realms of social discourse. As a business example, a bank must transfer data such as payments and loan information to other facilities, but it must also protect the privacy of its clients and not inadvertently release data regarding a customer's personal information such as telephone numbers, addresses, and bank account balances. Employees must often share information within a computing system that must be protected from outside businesses that might need only occasional access. Even among employees, some may be required to have certain information while other employees might be restricted from obtaining that data. In more complex situations, the access control might additionally be required to even limit when and/or where the data can be accessed. All of these requirements facilitate to make information access a substantial problem to overcome.

Traditional solutions to access control issues have typically only addressed one or two aspects of the total problem. They have lacked any type of flexibility to address multiple aspects. This resulted in solutions that provided high security but great effort to access or solutions that allowed only predefined levels of access to all users. These types of solutions do not allow for dynamic changes such as changes in access timing, changes in user status, changes based on contents of the information, nor changes that occur due to activities of the information holder. A user might desire to have co-workers who are working on a similar project to have access to information related to that project. However, the user might also want to disallow access to information about costs and projected sales analysis information to all but managers of the project. It is also conceivable that the user might also want to control when the managers receive the information if several different designs for a project were being considered, and the user only wanted to present the optimum budget information.

Likewise, it has become common for users to maintain information that facilitates them on a day-to-day basis with scheduling, tasks, and workloads. This information might be invaluable to tracking an employee's productivity and/or whereabouts. The employee might consider this information extremely private if a meeting was scheduled in place of another's meeting, and the user preferred to attend the second meeting. The user might not want the original meeting host to know why the user is not attending. So, in this example, accessing that information by the original meeting host is unacceptable to the user. However, other attendees of the second meeting might be grateful to obtain the user's information to validate that the user is in fact attending their meeting. Thus, the flexibility of controlling access to information is a highly desirable feature.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data access, and more particularly to systems and methods for providing control of sharing and privacy of data for collaboration. The invention includes attention given to the development and use of valuable abstractions about people and groups of people. Such abstractions allow policies on sharing particular types of information in a selective manner with others to be specified more simply, based on statements about organizational and activity-based relationships. These abstractions include groups that are relatively static over time, as exemplified by organizational relationships, and groups that are dynamic over time, such as groups defined by meetings, communications, and other ongoing and changing activities. Dynamic and static groups of users are leveraged to provide an easy proliferation means for information between users with a "need-to-know." An instance of the present invention can also provide these users information based on a "time-to-know." By providing access to information based on group affiliation and properties of the content of the information, the present invention maintains optimal information privacy while minimizing encumbrances to sharing data with appropriate users and even at appropriate times. The dynamic grouping nature of one instance of the present invention allows for incorporation of data dissemination controls based on, for example, availability, location, and/or preferences of a data owner.

Additionally, the present invention can be integrated with other communication technologies to facilitate access to information in a time appropriate manner. Information regarding location of an individual can be withheld, for example, until an hour before a meeting and accessible only by those attending the meeting. This allows protection and privacy of data until it is actually required by authorized group members. Other instances of the present invention employ automated techniques to facilitate in constructing access policies utilized by the present invention. The automation can incorporate such aspects, for example, as a data owner's preference, a context of a data owner, and/or properties of the contents of the data. Additional instances of the present invention include employment of machine learning techniques to facilitate construction of access policies. Thus, the present invention provides an extremely flexible, highly secure information protection means while still providing an increase in data sharing among collaborators in a group, allowing data to flow where and when it is needed, increasing a group's productivity.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
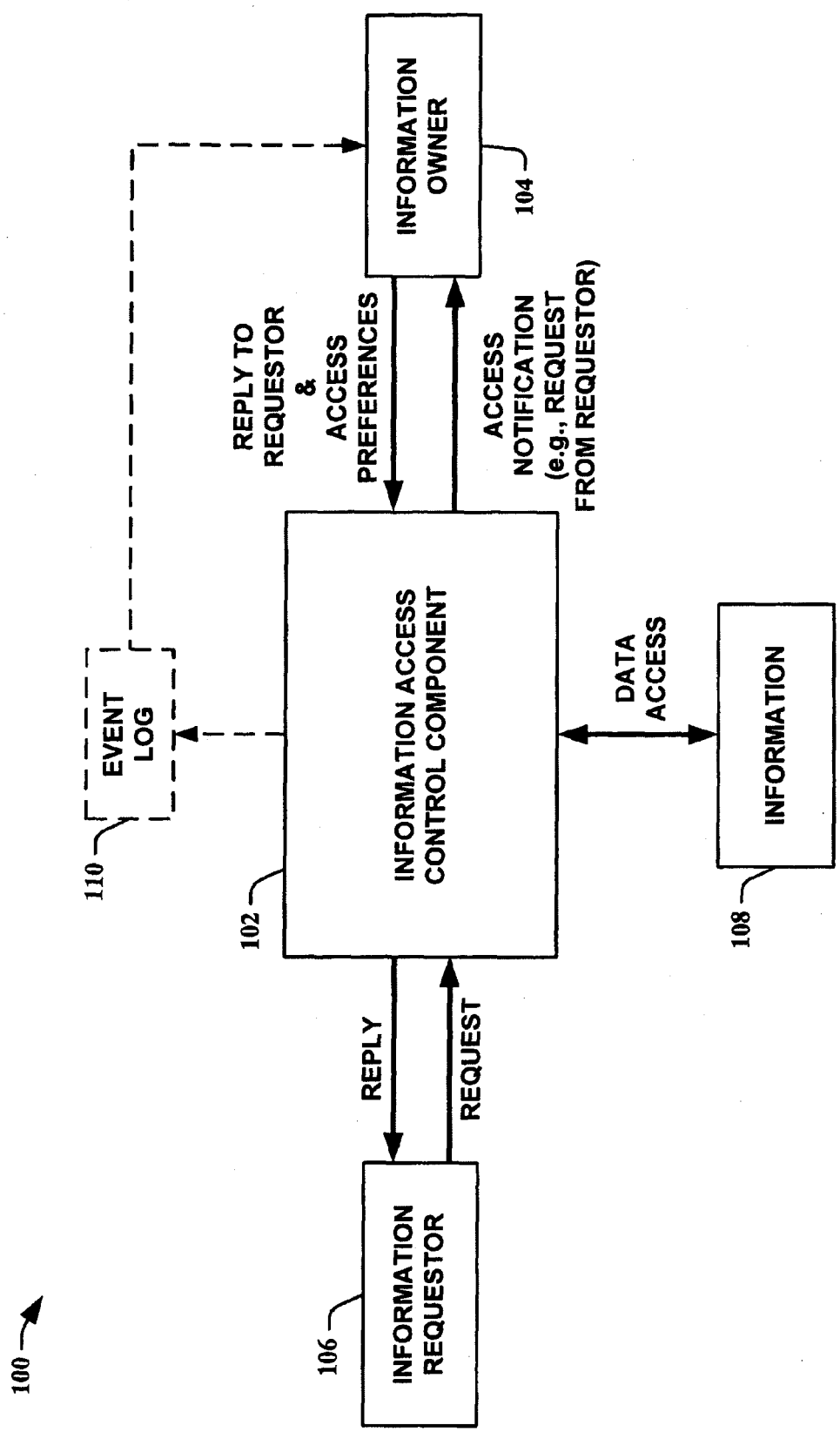
FIG. 1 is a block diagram of an information access control system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides systems and methods for controlling sharing and privacy for collaboration, overcoming issues of opaque, pessimistic access control logic (ACLs). It provides users with an ability to specify static and dynamic groups and to give privileges to groups based on group membership and properties of content. Groups can be assigned dynamically based on activities, such as people who will be meeting with a user in an hour. The present invention provides access policies including optimistic policies of sharing with logging, sharing with logging with a message to users that their actions are being logged, and/or alerting where indicated that information has been accessed. Other access policies can include mixed-initiative approaches where a user is informed of real-time and/or store-forward requests by others for information access, where the mixed-initiative policies can be based on group membership. Beyond direction manipulation, instances of the present invention provide access control methods that can include the development of "sharing agents" that automate policies depending on the user's availability, the identity of the requestor, and/or the nature of the content and the like. Access policies can also be based on standard notions of file system folders and/or on properties of content, e.g., per properties of content as encoded in file system schema.

In FIG. 1, a block diagram of an information access control system 100 in accordance with an aspect of the present invention is shown. The information control access system 100 is comprised of an information access control component 102 that interacts with an information owner 104, an information requestor 106, an information source 108, and an optional event log 110. In other instances of the present invention, interacting directly with the information owner 104 can be optional. The information access control component 102 provides privacy and sharing control for information owned by the information owner 104. It 102 employs default access policies, automatic access policies, and/or semi-automatic access policies based on user group affiliations of the information requestor 106 and properties of the information's content from the information source 108. This permits efficient interaction for group members who are collaborating on a task and desire access to the information. It also relieves requiring the information owner 104 to constantly alter access privileges to ensure that the correct users receive the right information at an appropriate time. Collaboration efforts can include, but are not limited to, meetings, projects, tasks, and/or communications. The present invention provides dynamic construction of user groups that allows real-time access control permission changes based on the information owner's status change and/or new group affiliations for a user. In addition, the properties of the information content can also dynamically alter the user groupings.

Turning back to FIG. 1, the information requestor 106 attempts to access a desired piece of information from the information source 108. The information access control component 102 detects the access attempt and sends an initial and/or final reply to the information requestor 106. If the information requestor 106 is not properly affiliated with an access group for the desired information and/or other control parameters such as timing, number of accesses, properties of the information content and the like are not met, the information access control component 102 can immediately reply that the information requestor 106 does not have permission to access that particular piece of information. In other instances of the present invention, the information access control component 102 can send a reply such as, for example, indicating that the information access is being logged, requesting a reason for the access, and/or acknowledging that access is granted and the like. The information access control component 102 can also send an access request, access attempt notification, and/or access reply and the like to the information owner 104. This allows the information owner 104 to be cognizant of information accesses and to interactively control access permission if desired. If an interactive request is part of the reply, the information requestor 106 can send the required information to the information access control component 102 which relays it to the information owner 104. The notification can also include a reason for desiring access by the information requestor 106. This permits the information owner 104 to interact with the information requestor 106 so that a viable access request is not inadvertently dismissed.

In other instances of the present invention, the interaction by the information owner 104 is not required, and access requests are entirely processed by the information access control component 102. Access events can also be logged into the optional event log 110. This allows a record of such activities, for example, as accesses, attempted accesses, duration of accesses, frequency of accesses, copying, forwarding, and other information altering activities such as writing to the information and/or resaving the information and the like. The event log 110 can also be read by the information owner 104 and/or others who have permissions to access the data. The present invention gives collaborators substantially more efficient access to the information source 108 on an as-needed and when-needed basis. This flexibility allows the present invention to be incorporated with other communication systems to increase productivity. The present invention can utilize, for example, availability, context, and/or timing information from context aware programs, scheduling programs, and other types of availability programs to enhance its overall usability. This allows, for example, telephone contact information to be released to a user group associated with a meeting that is to take place within an hour. Permissions to access location and contact information can be granted automatically, for example, to the meeting organizer an hour before the meeting is to occur. This example illustrates how the present invention can increase productivity through providing dynamic user group and properties of contents based access privileges.

Figure 2:
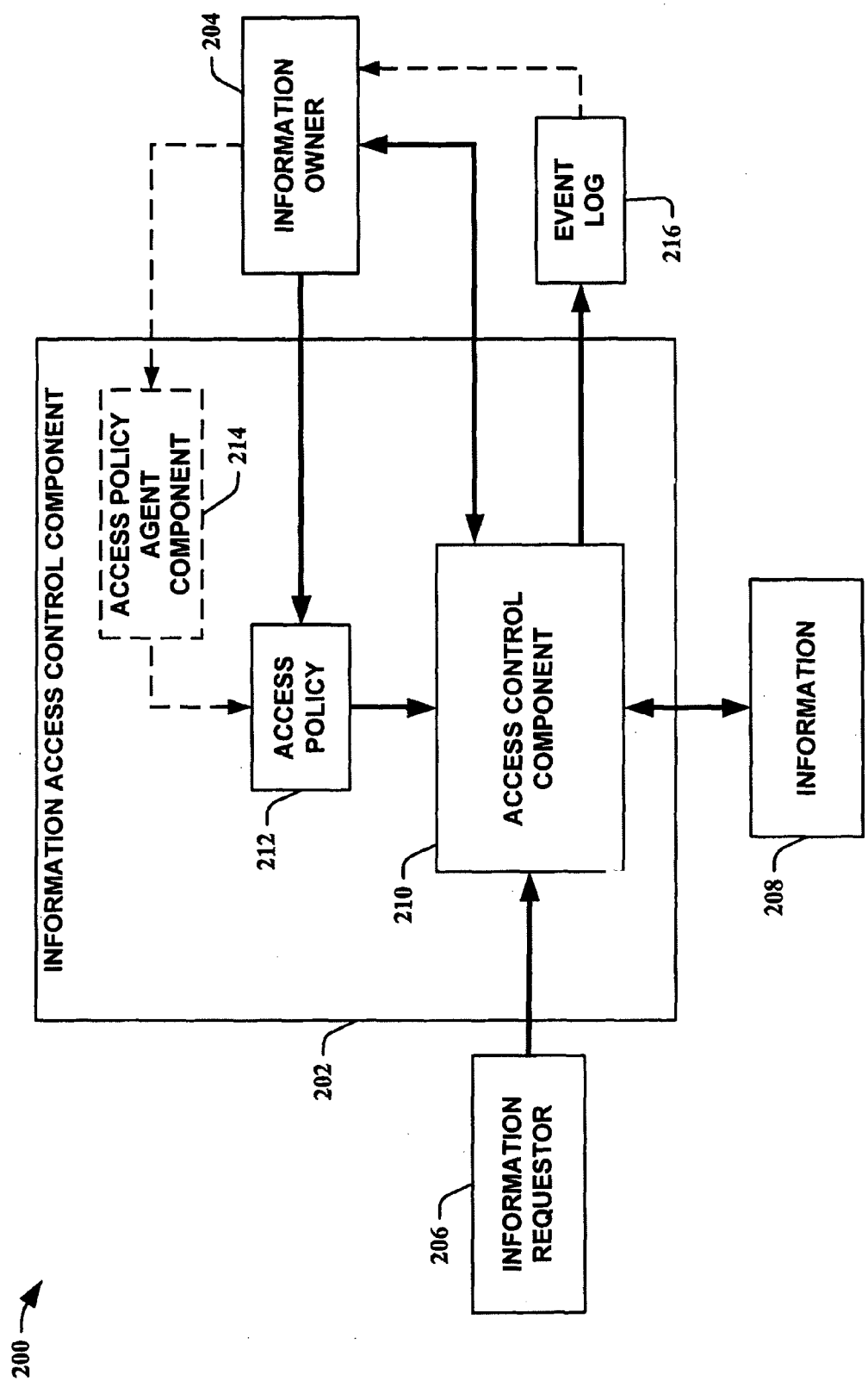
FIG. 2 is another block diagram of an information access control system in accordance with an aspect of the present invention.

Referring to FIG. 2, another block diagram of an information access control system 200 in accordance with an aspect of the present invention is depicted. The information access control system 200 is comprised of an information access control component 202. The information access control component 202 is comprised of an access control component 210, an access policy 212, and an optional access policy agent component 214 (e.g., "sharing agent"). The access control component 210 interfaces with an information owner 204, an information requestor 206, an information source 208, and an event log 216. It 210 employs the access policy 212 to control sharing and privacy of the information source 208 for the information owner 204. The access policy 212 can be a default policy, a default information owner policy, an information owner preference policy, and/or an automatically generated policy and the like. The optional access policy agent component 214 can generate the access policy 212 based on direct and/or indirect interactions with the information owner 204. The access policy agent component 214 can also be utilized to facilitate the access policy 212 such as, for example, altering an existing default policy and/or dynamically updating an information owner's preference policy. This aspect of the present invention affords substantial flexibility in allowing real-time access changes based on, for example, an information owner's context, availability, and/or timing and the like. By basing the access policy 212 on dynamic and/or static user groups and the properties of the contents of the information, the present invention provides a means to allow better collaboration through the sharing of data while still maintaining high levels of privacy where required.

Figure 3:
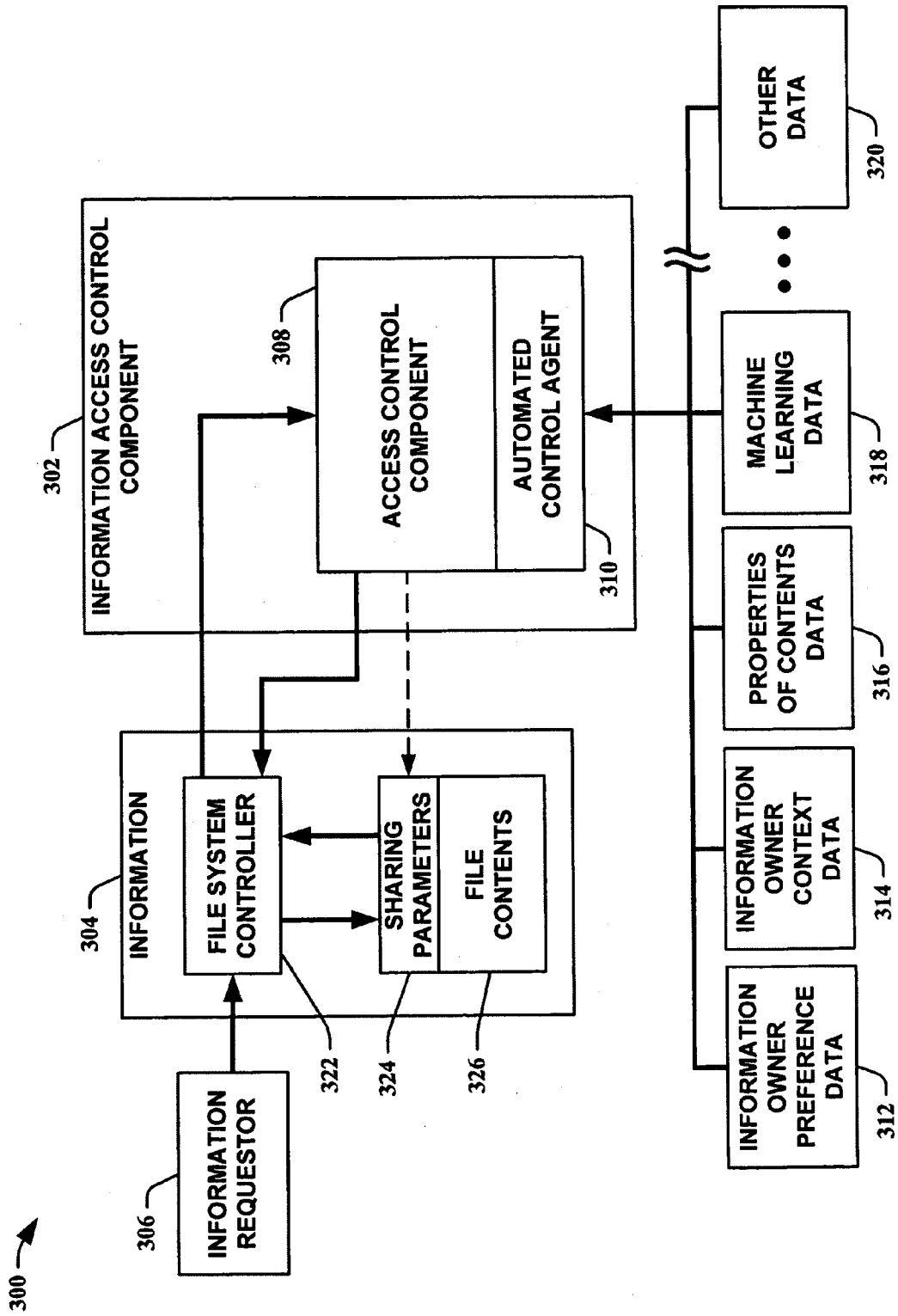
FIG. 3 is yet another block diagram of an information access control system in accordance with an aspect of the present invention.

Turning to FIG. 3, yet another block diagram of an information access control system 300 in accordance with an aspect of the present invention is illustrated. The information access control system 300 is comprised of an information access control component 302 that interacts with an information source 304. The information access control component 302 is comprised of an access control component 308 and an automated control agent 310. The information source 304 is comprised of a file system controller 322, sharing parameters 324, and file contents 326. In this instance of the present invention, the sharing parameters 324 (i.e., access controls) are utilized along with the file system controller 322 as part of the information access control system 300. The access control component 308 interfaces with the file system controller 322 to directly control access to the file contents 326 and/or indirectly interfaces with the sharing parameters 324 to control access to the file contents 326. In one instance of the present invention, when the information requestor 306 requests access from the file system controller 322, the file system controller acts as an access controller by reading the sharing parameters 324 implemented by the access control component 308 to either grant, deny, and/or request further information from/to the information requestor 306. In this manner, the sharing and privacy of the file contents 326 is protected by the access control component 308 in a non-direct method.

In another instance of the present invention, the file system controller 304 interacts directly with the access control component 308 to determine access rights for the information requestor 306. In yet another instance of the present invention, the file system controller 304 determines access rights based upon both the sharing parameters 324 and the access control component 308, providing a combination of direct and indirect control by the access control component 308. These instances of the present invention illustrate the inherent flexibility of the present invention to interface with file systems while still insuring that sharing and privacy are maintained for the file contents 326. One skilled in the art will appreciate that other variations of file system interactions with the present invention are possible and fall within the scope of the present invention.

This example of an instance of the present invention also illustrates interactions of the automated control agent 310. It 310 interfaces with the access control component 308 and receives information from various data sources 312-320. The various data sources 312-320 are comprised of an information owner preference data source 312, an information owner context data source 314, properties of information contents data source 316, machine learning data source 318, and other data source 320. The automated control agent 310 permits dynamic and/or tailored access policy changes for the information access control component 302. Thus, the present invention provides for flexible access policies to enhance its adaptability to changes in circumstance, group membership, timing, and/or locations and the like. The automated control agent 310 can construct an access policy from the various data sources 312-320.

The information owner preference data source 312 can be comprised of preferences such as, for example, types of groups, members of groups, access timing, notification parameters, logging parameters, default preferences, frequency of accesses, duration of accesses, read/write privileges, and other preferences and the like that facilitate an information owner to tailor the access policy for their specific needs and desires. The information owner context data source 314 can be comprised of contextual data for an information owner such as, for example, location, activity, anticipated activity level, anticipated location, and/or available communication means (e.g., telephone, email, etc. available for use by information owner) and the like. The properties of contents data source 316 is comprised of data relating to the contents of data controlled by the information owner. This data source 316 can include, for example, parameters such as sensitivity of the data relative to business activities (e.g., pricing schedules, etc.), sensitivity of the data relative to personal activities (e.g., home telephone number, address, etc.), value of the data relative to the information owner (e.g., only copy of significant report due immediately, etc.), and/or collaborative value relative to user groups and the like. One skilled in the art can appreciate that the contents of data can lead to an innumerable amount of parameters that can be exploited by the present invention, all within its scope.

The automated control agent 310 can also utilize the machine learning data source 318 that can be comprised of data such as, for example, information about an information owner's access control relative to specific data, information about the information owner's desires with regard to access of certain data based on the owner's location and/or time of day, and/or any other type of forecasting of the owner's preferences with regard to access controls. One skilled in the art will appreciate that machine learning techniques can be applied to the information owner's activities with regard to access as well as the information owner's preferences of content privacy with regard to access. Because the automated control agent 310 provides great flexibility in constructing an access policy for the information access control component 302, additional data can also be utilized as represented by the other data source 320. Thus, if relevant, even weather, current news, and other environmental information along with business strategy changes, price fluctuations and the like, can be incorporated into the present invention.

Traditionally, sharing and approaches to allow access to documents and other data has been an "all-or-nothing" approach which is often too constraining. Fear is often cited as the main reason for not wanting to share data. Some of these fears include political manipulation, increased information overload, no control over the spread of information, uncertainty of the origin of data, possible harm from dissemination of data, risk of obligating oneself, adverse effect on recipient, loss of status or prestige (embarrassing), loss of credit for work done, unethical or inappropriate, and/or loss of access to future information and the like. Thus, users typically have an urgent need to be assured that they can maintain control over the who, what, when, and where of their data access. Overcoming these fears and permitting a level of sharing can yield great benefits, especially when working with collaborators to perform a given task or project. Despite these benefits, typical access control logic provides very poor choices and extremely time consuming and difficult control implementations. The present invention, however, provides expressive and usable controls for accessing data.

Generally speaking, there are three main perspectives to controlling access. A pessimistic approach requires that all access privileges are set prior to any attempted access. This requires that the data owner has prior knowledge of exactly who, when, and what they need to provide access for. An optimistic approach allows access with monitoring and revokes access deemed to be unnecessary or beyond access guidelines. A mixed-initiative approach grants authorization at the time of access and can have either optimistic or pessimistic default settings. It allows for multiple dimensions of trust and incorporates such aspects as consideration of task, identity, and context of a desired access (see generally, E. Horvitz; Principles of Mixed-Initiative User Interfaces; Proceedings of CHI '99, *ACM SIGCHI Conference on Human Factors in Computing Systems*; Pittsburgh, Pa.; May 1999; http://research.microsoft.com/~horvitz/UI-ACT.htm). A cost-benefit analysis can also be utilized to determine the costs of deferring an access decision versus the benefits of the immediate sharing of data. This approach can also utilize machine learning techniques to construct policies by watching explicit settings utilized by a data owner. The present invention incorporates aspects of all of these types of access control in an easy, user-friendly interface.

The present invention utilizes presence and availability of a user such as a data owner. The user's location can be utilized to determine the necessity of sharing certain information. The user's availability in relation to costs of interrupting a user for an access request versus cost of denying access can also be employed. Available communication channels can also facilitate to determine the cost (i.e., difficulty) of receiving access permission. The user's current activities such as schedules and/or live monitoring and the like can also be employed. All of these types of information can be utilized by the present invention to facilitate construction of dynamic groups that have specific access privileges. Thus, a group that includes those users who a person has a meeting within the next hour can be granted access to information regarding the person's location and means of contact. It is also possible to forward calls and/or emails to the person's exact location to make the person aware of the access and activity. If a user is not included in the dynamic group of meetings within an hour, that user is not permitted to access the person's location information and their attempted contact, whether by telephone or email, for example, is not forwarded to the person. This alleviates the person from having to grant/deny accesses continuously and from having unimportant interruptions. Likewise, the present invention can also be utilized in "beyond now" presence and availability forecasts. Forecasting information can be employed to delay access privileges and/or determine if routing of communications is necessary in the future.

The present invention can also utilize properties related to the contents of access controlled data in determining access privileges. Similarly to granting access to data based on dynamic groups, if the content of the data changes and/or if the value relative to a data owner's activity, location, and/or availability changes, access privileges can be revoked and/or granted to a dynamic and/or static group. The present invention has the flexibility to adjust access privileges as the data content properties change. Likewise, digital rights associated with the data contents can be utilized to prohibit groups. Additionally, transactional fees can be charged before access is granted if necessary. Data contents can also have a subset access realm within a particular business such that a member of a group for a meeting within an hour can be denied access to the information if the member is an employee of another business while still allowing all other group members access. This can occur dynamically if a group member's employment status changes.

Figure 4:
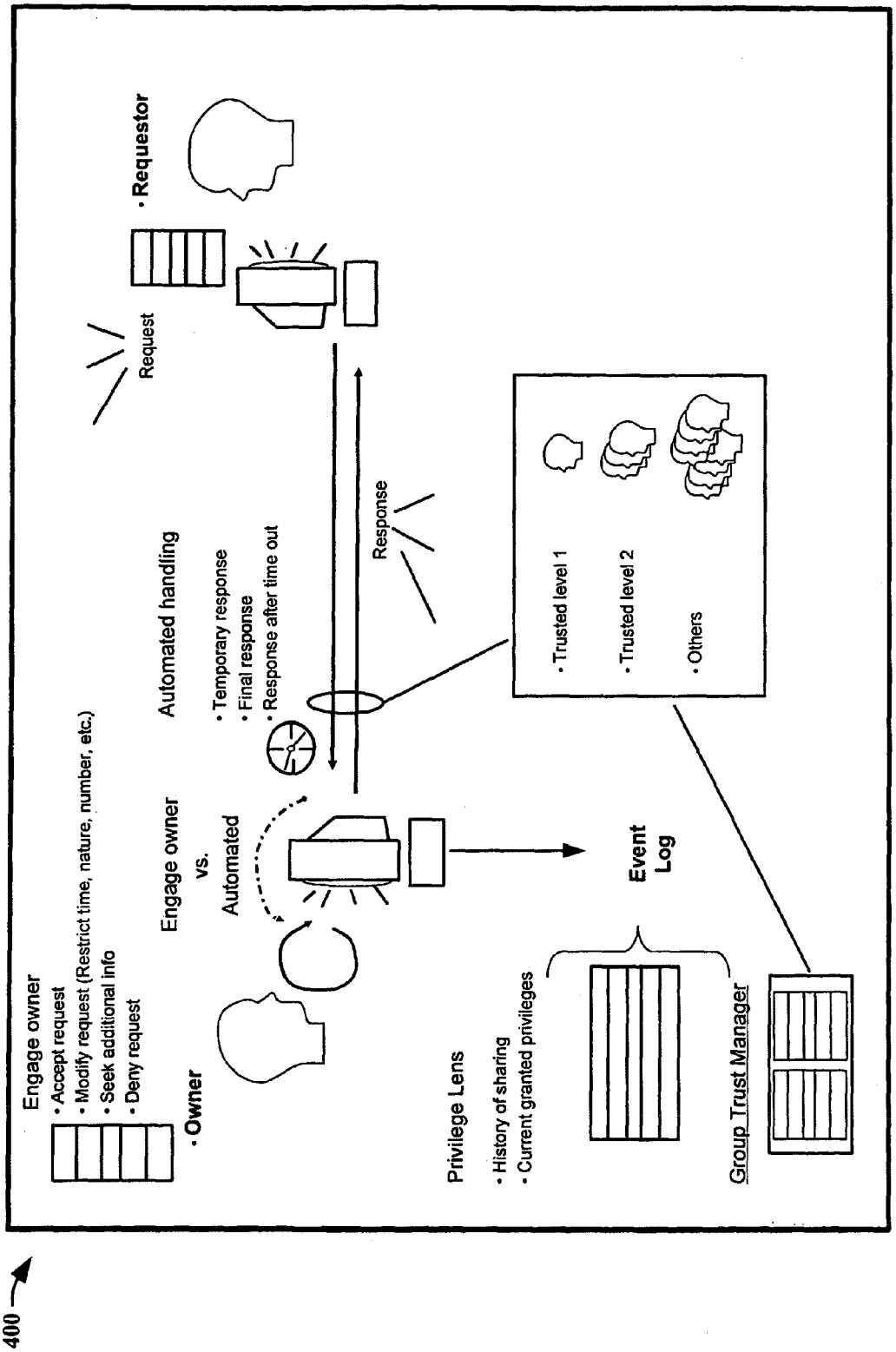
FIG. 4 is an illustration of information access control in accordance with an aspect of the present invention.

Thus, the present invention provides improved systems and methods of controlling sharing and privacy for collaboration. It addresses the problems of opaque, pessimistic access control logic. It provides users with an ability to specify static and dynamic groups and to give privileges to groups based on group membership and properties of content. Groups can be assigned dynamically based on activities, such as people who will be meeting within an hour. The present invention employs these methods to allow it to be extremely flexible to better enhance collaboration. In FIG. 4, an illustration 400 of information access control in accordance with an aspect of the present invention is shown. This illustration 400 depicts a requestor and an owner engaging in access control based on the present invention. The requestor can receive an automated response and/or can receive an interactive response from the owner. Responses are typically predicated upon parameters such as trust level associated with a particular requestor, based on a group affiliation, "need to know" and/or "time-to-know." If the owner desires to interact with the requestor, the owner can decide to accept the request; modify the request such as restricting access times, restricting nature of access, and/or number of accesses and the like; seek additional information from the requestor such as reason for needing the information and the like; and/or deny the request sent by the requestor. When the requestor sends a request, the present invention can immediately respond with a message such as "access being logged," "request denied," "additional information required," and/or "request being forwarded to information owner" and the like. This gives the requestor immediate feedback after selecting the desired data to access. Thus, the requestor is assured that their request is being processed. If the processing takes beyond a certain amount of time, the requestor can also receive a timeout notification.

After determination of access privileges by the present invention, whether automated and/or interactive, the requestor is presented with a final response to their request such as, for example, "access granted," "access denied," "access available at later time," and/or "access granted for allotted time period" and the like. Thus, access can be granted for limited periods of time and/or limited numbers of times. A privilege filter (i.e., privilege lens) can include such parameters, for example, as history of sharing, current granted privileges, level of privacy for data contents, and trust level of requestor and the like. Typically, activities related to accesses and attempted accesses are stored in an access event log that can contain, for example, requestor identification, time of request, number of accesses, and/or duration of accesses.

Figure 5:
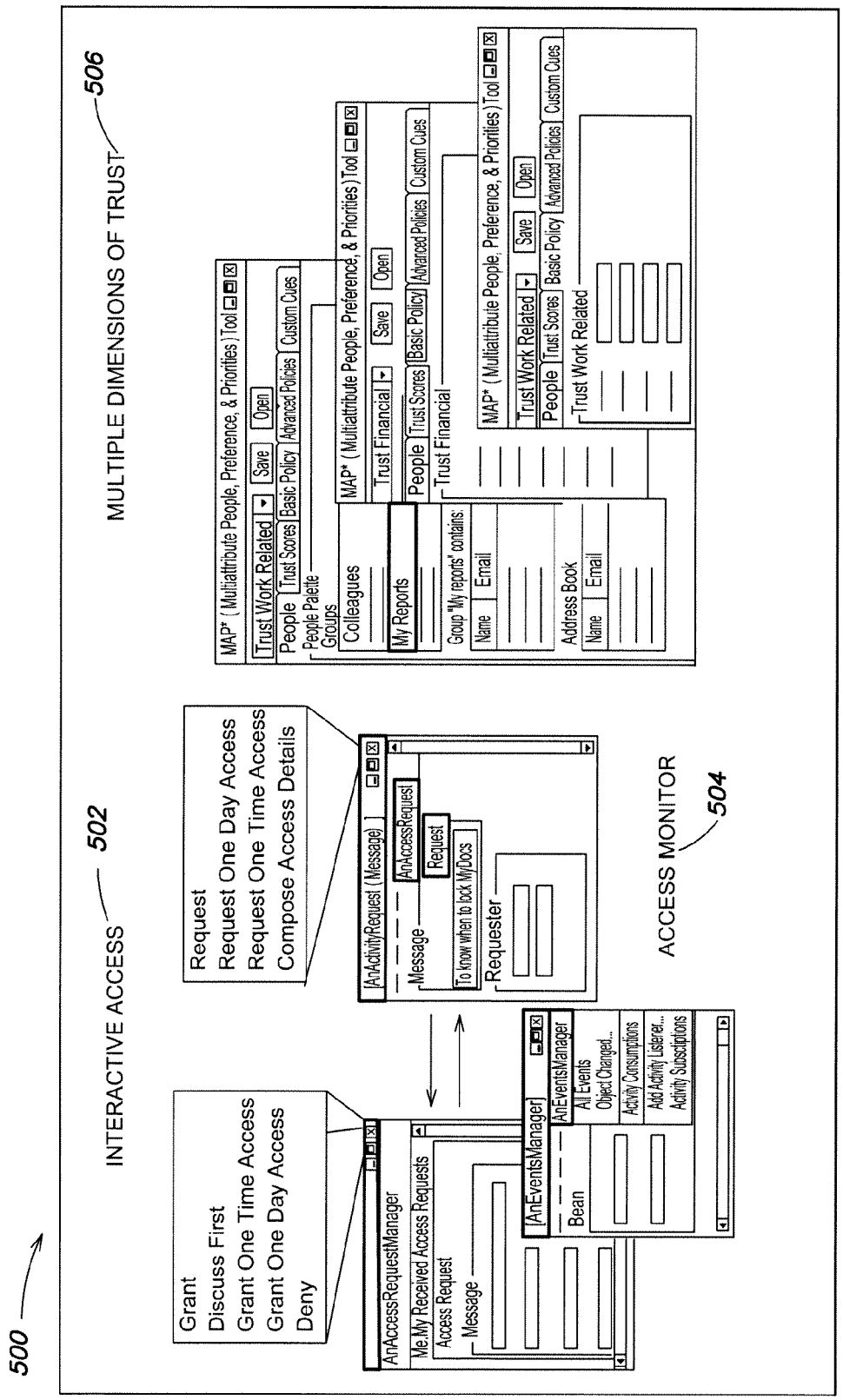
FIG. 5 is another illustration of information access control in accordance with an aspect of the present invention.

Referring to FIG. 5, another illustration 500 of information access control in accordance with an aspect of the present invention is depicted. In this illustration 500, user interfaces are shown with regard to various aspects of the present invention. For an interactive access process 502, a requestor can specify such parameters, for example, as length of time for access, number of accesses, and/or access details (e.g., copying, forwarding, reading, writing, etc.). An information owner can select various access responses such as grant access, interact with requestor, grant limited number of accesses, grant a time period for an access, and/or deny an access attempt. An information owner can also choose to utilize an access monitor 504 to track accesses to various data. This example of a user interface for an access monitor permits such parameters, for example, as track all events, track only changes, alter desired tracking activities, and/or add additional monitoring users and the like. The present invention can also include multiple dimensions of trust 506 to allow groups based on trust. Varying access privileges can then be generated for users of various trust levels.

Another instance of the present invention utilizes logical and/or statistical clustering of users, for example, by examining and/or logging sharing settings; and making available such setting profiles to other users for utilization and/or modification. For instance, the present invention can examine the profiles of many users in an organization and anonymize the information; and then make these profiles available directly and/or via utilization in a recommendation engine. In a recommendation engine, the present invention employs such information to build an inferential model that can predict a new user's profile based on, for example, position in an organization and/or current subsets of settings and the like. The model provides recommendations, for example, about settings, as well as a sorted list of most similar profiles to provide a starting point for a new user. Other instances of the present invention utilize 'collaborative filtering' as the inferencing methodology.

Other instances of the present invention employ methods to determine whether a sharing policy is manual (e.g., "ask me if someone in groups A, B, or C ask for content X, Y, or Z) and/or automatic (e.g., automatically share content X if particular users ask for it, but log the requests and the accesses). The determination can be made a function of:
  On the delay until a user gets to see and/or act on the request (for example, max. wait time, e.g., 15 minutes) and/or based on a forecast of a wait time (for example, user will likely be away for more than 15 minutes based on a current situation). Thus, the present invention can utilize methods based on a more general process that employs a user's current and/or future context, e.g., availability (including a user's location, distance from a user's office and/or distance from a communication means such as, for example, another computer, telephone, etc.)
  On a user's current "busy-ness" or workload (i.e., more generally, a user's current cost of interruption)—how busy is the user now and in the future, leading to a varying cost of alerting.

Figure 6:
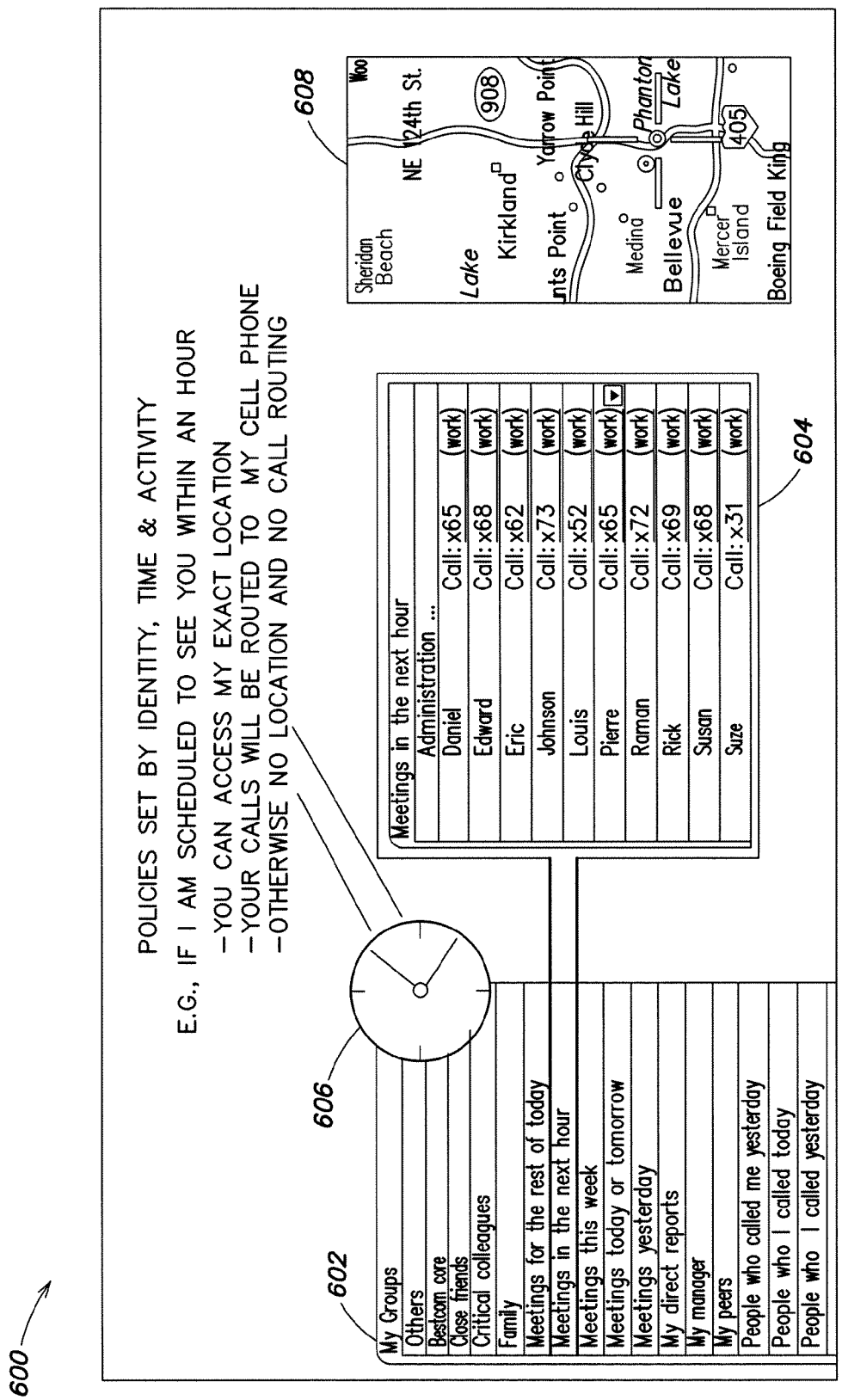
FIG. 6 is a diagram illustrating access policy determination in accordance with an aspect of the present invention.

Thus, the present invention provides methods to consider the cost of delayed sharing and/or the cost of alerting in a decision to move from a manual request to an automated share decision. The present invention can also consider the inferred time urgency of a request (e.g., the user, content, etc., can be considered with rules and/or richer statistical models, to predict urgency of need). In FIG. 6, a diagram 600 illustrating access policy determination in accordance with an aspect of the present invention is shown. The diagram 600 depicts groups 602 selected by a user for employment with determining sharing of information. The group "Meetings in the next hour" is a dynamic group that changes depending on meetings and their times. In this example, a list 604 of users that have been dynamically assigned to the group is shown. Users on the list 604 are granted access based on a time delay-based switching method between waiting for a manual answer and an automated policy (thus, "mixed-initiative"). A clock 606 represents this delay in a switching period.

For example, a user might prefer to be asked and to give manual authorization when a request for contents X by a user Y arises in a particular situation. However, the user is given a way to say that, if the user is not around and/or too busy, the system should go ahead and either grant the entire request, or simply to relay the potential delay to the requestor, or actually go ahead and grant some aspect (e.g., the first page, a summary, etc.) of the request of the full request until the user can manually review the situation and grant the request directly.

Thus, other instances of the present invention employ methods that make the mixed-initiative versus automatic policy dependent in part on the current availability (including location, access to computer, etc.) and/or workload of user, and, more generally, on the cost of alerting and cost of delays with requiring a human response. The basic idea is that a user may say that they would like to be asked (that is, the user wants mixed-initiative interaction, "if the user can afford it"), and, thus, would like to review requests and/or give the user's personal permission for requests for access of type X, Y, Z, etc. and/or information of type A, B, C and requests 1, 2, 3—but if the delay will likely be too great, and/or if, per the user's current context, the cost will be too great on alerting the user (and it will be too long until the user is free to interact), the present invention can just go ahead and give out the information—that is, give it out, given such real and/or expected waits for these kinds of information and requestors.

With regard to timing, the present invention can consider a maximal bound on wait time (e.g., if a user hasn't answered to a pending request within 15 minutes, then go ahead and do it automatically) and/or a prediction on time (e.g., predicting time until a user returns to the office and/or predicting time for reading email based on a Bayesian inference about the time until available (e.g., on a networked computing system) from multiple observations including time since last seen in office and/or on the networked computer, calendar information, GPS sensing, etc.) forecasts of how much time it will take a user to answer a request. For example, policy shifting from manual response to automated with logging: If a request X comes in from a particular user in group 1, and a user in control of the requested information is not going to be available for more than, for example, 30 minutes, then take this action: e.g., allow the title and abstract to be sent immediately with a note saying the user with access control will be delayed, and alert the control user on their mobile device about the pending request.

Or, if the control user will not be available for more than time t after receiving a request (or proxies for unavailability, e.g., in location M (travel out of the country, out of the office, etc.)), then just give immediate access instead of waiting, else continue to wait for the control user's response until hitting, for example, the 30 minute bound. Or the present invention can consider the expected time and do this immediately, without waiting if the time until the control user will be available will be more than, for example, 30 minutes with a 0.9 probability (see generally, E. Horvitz, P. Koch, C. M. Kadie, and A. Jacobs; Coordinate: Probabilistic Forecasting of Presence and Availability; Proceedings of UAI '02, *Proceedings of the Eighteenth Conference on Uncertainty and Artificial Intelligence*; Edmonton, Canada; July 2002, pp. 224-233; http://research.microsoft.com/~horvitz/Coordinate.htm). Beyond going ahead with a yes, no, another option is to say, "sorry, please wait until the control user is available," and give an estimate of the time in which the control user will be available—for example, "The user with access control will likely not get back to you on this for another 30 minutes."

With regard to 'busy-ness,' a user might prefer to be asked, but if the user is doing one of a list of things the user has defined as being busy, or if an inferential model says that the user's current cost of interruption is greater than C [see generally, (E. Horvitz, A. Jacobs, D. Hovel; Attention-Sensitive Alerting; Proceedings of UAI '99, *Conference on Uncertainty and Artificial Intelligence*; July 1999; Morgan Kaufmann Publishers: San Francisco; pp. 305-313; http://research.microsoft.com/~horvitz/attend.htm), (E. Horvitz and J. Apacible; Learning and Reasoning about Interruption; *Proceedings of the Fifth ACM International Conference on Multimodal Interfaces*; November 2003; Vancouver, BC, Canada; http://research.microsoft.com/~horvitz/learninterrupt.htm), and (E. Horvitz, C. M. Kadie, T. Paek, D. Hovel; Models of Attention in Computing and Communications: From Principles to Applications; *Communications of the ACM;* 46(3):52-59; March 2003; http://research.microsoft.com/~horvitz/cacm-attention.htm), the user can select to go with an optimistic yes, or a no, or "the user is busy, can you check back later, it'll likely be more than T minutes." Also, the present invention can consider the urgency of the request (e.g., group 1 requests are always urgent, group 1's request for information of type Y is always urgent, or use of statistical classifiers for predicting urgency from people, content, context, etc. (see, messages in Priorities, Horvitz, Jacobs, Hovel UAI '99, supra).

Figure 7:
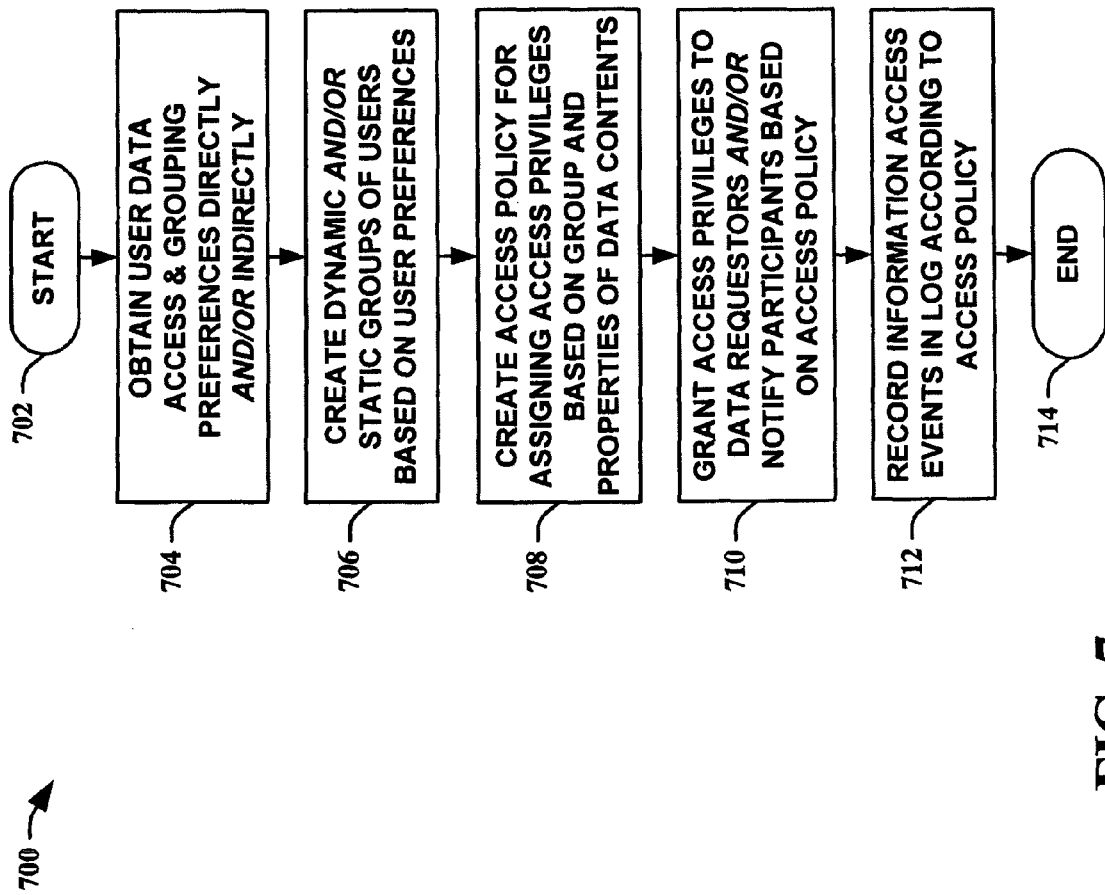
FIG. 7 is a flow diagram of a method of facilitating information access control in accordance with an aspect of the present invention.
Figure 8:
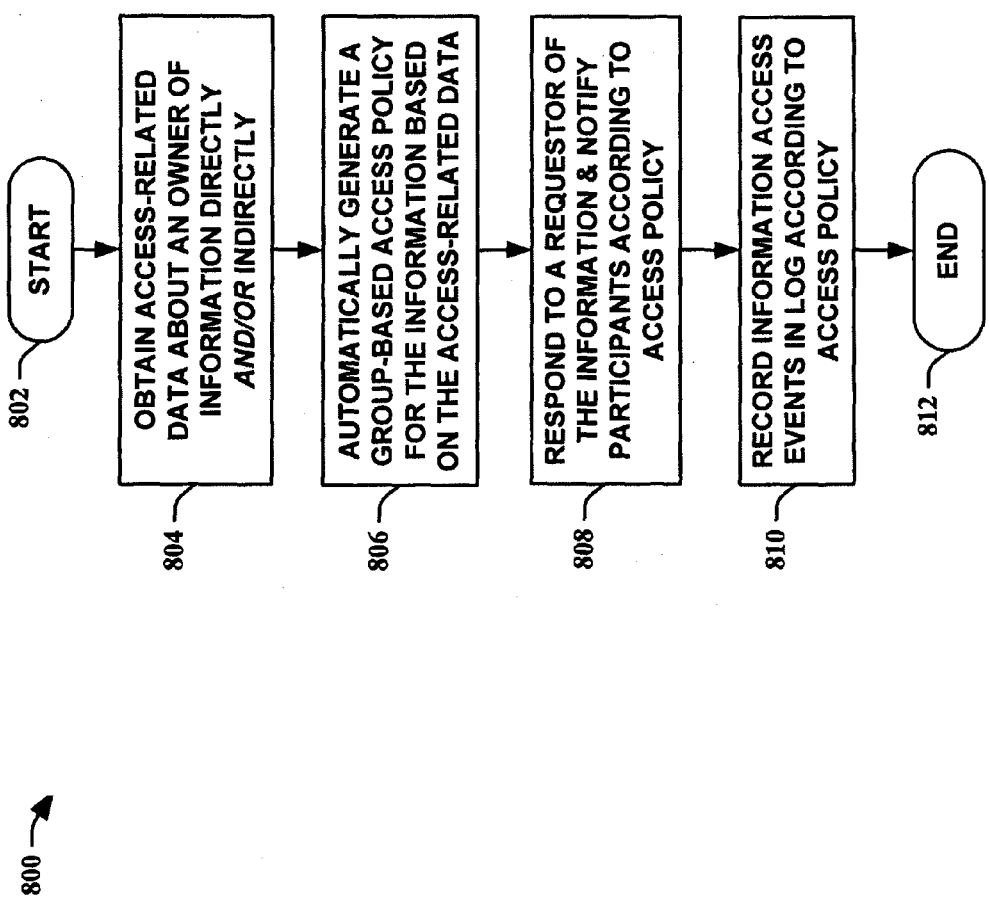
FIG. 8 is another flow diagram of a method of facilitating information access control in accordance with an aspect of the present invention.

In view of the exemplary systems shown and described above, methodologies that may be implemented in accordance with the present invention will be better appreciated with reference to the flow charts of FIGS. 7-8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

In FIG. 7, a flow diagram of a method 700 of facilitating information access control in accordance with an aspect of the present invention is shown. The method 700 starts 702 by obtaining user data access and grouping preferences directly and/or indirectly 704. This information can be obtained directly from a data owner such as a user interface that requests information to be filled in, and/or it can be derived from interactions both passively and actively with the data owner. Machine learning techniques can be utilized as well to facilitate in obtaining additional information. Dynamic and/or static groups of users are then created based on the user preferences 706. The groups can be created directly from a preference stating what users are to be included in a group and/or directly from a preference stating what types of users are to be included in a group and the like. Other information such as context information about a data owner can also be utilized. The groups can also be created indirectly from information obtained about the data owner. An access policy is then created for assigning access privileges based on group affiliation and properties of a data's content 708. This allows easy dissemination of data among collaborators while restricting access to other requestors. When a request is made for access, the access is processed based on the access policy and permission is granted and/or denied to the requestor along with notification of the request to the data owner 710. In other instances of the present invention, the data owner is not notified directly. In these instances, the data owner may desire to review access requests from an event log at another time instead of real-time. The flexibility of the present invention allows for this type of fully automated, semi-automated, and/or manual types of approaches to access control. In this instance of the present invention, the access request is recorded into an event log according to the access policy 712, ending the flow 714. The types of information stored in the event log can include, but is not limited to, time of access, duration of access, access requestor's identification, changes made, and/or copying and the like.

Referring to FIG. 8, another flow diagram of a method 800 of facilitating information access control in accordance with an aspect of the present invention is depicted. The method 800 starts 802 by obtaining access-related data about an owner of information directly and/or indirectly 804. This includes information such as, for example, context of the owner, availability of the owner, communication means available to the owner, preferences of the owner, and/or machine learning data about the owner and the like. A group-based access policy is then automatically generated for information based on the access-related data 806. This process also takes into account properties of the contents of the information such as value, privacy level, and/or type and the like. The automatic generation can also employ machine learning techniques as well. When a request is generated for the information, a requestor is responded to according to the access policy and the owner of the information is also notified according to the policy 808. Notification of the owner is optional in other instances of the present invention. The access event is then recorded in an access event log according to the access policy 810, ending the flow 812. The automatic construction of access policies allows the present invention to adapt real-time to events and circumstances that a data owner may not be able to or be able to do in a timely and efficient manner. It also allows the data owner to establish types of groups and allows the access policy to determine access based on group affiliations, timing, and/or other variables.

The present invention also allows for user interaction with information access controls. One method of allowing user interactivity is to provide a graphical style user interface. A user can then initiate, change, review, and/or augment the access control information provided by the present invention easily. One skilled in the art can appreciate that a multitude of varying graphical interfaces are possible. As an example of just one possible interface of the present invention, an illustration of a graphical user interface set or "process" is described. Generally, a user interface is comprised of at least one graphic, often a set of graphics that is generated by a computing device and shown on a display for visual reference and interaction by the user. This set of graphics is typically referred to as a "graphical user interface" (GUI) even though it is comprised of more than one graphic. Thus, components such as sub-graphics, drop down menus and tables, selection devices, and text entry boxes and the like are all considered part of the graphical user interface.

Likewise, the present invention also includes non-graphical user interfaces such as text based user interfaces and/or mixed graphics/text based interfaces. Although generally not as easy to interface with as a graphical interface, a text based interface can still be employed by the present invention to allow user interaction and to also allow a single user action, such as a key stroke, to initiate enhanced features of the present invention.

Figure 9:
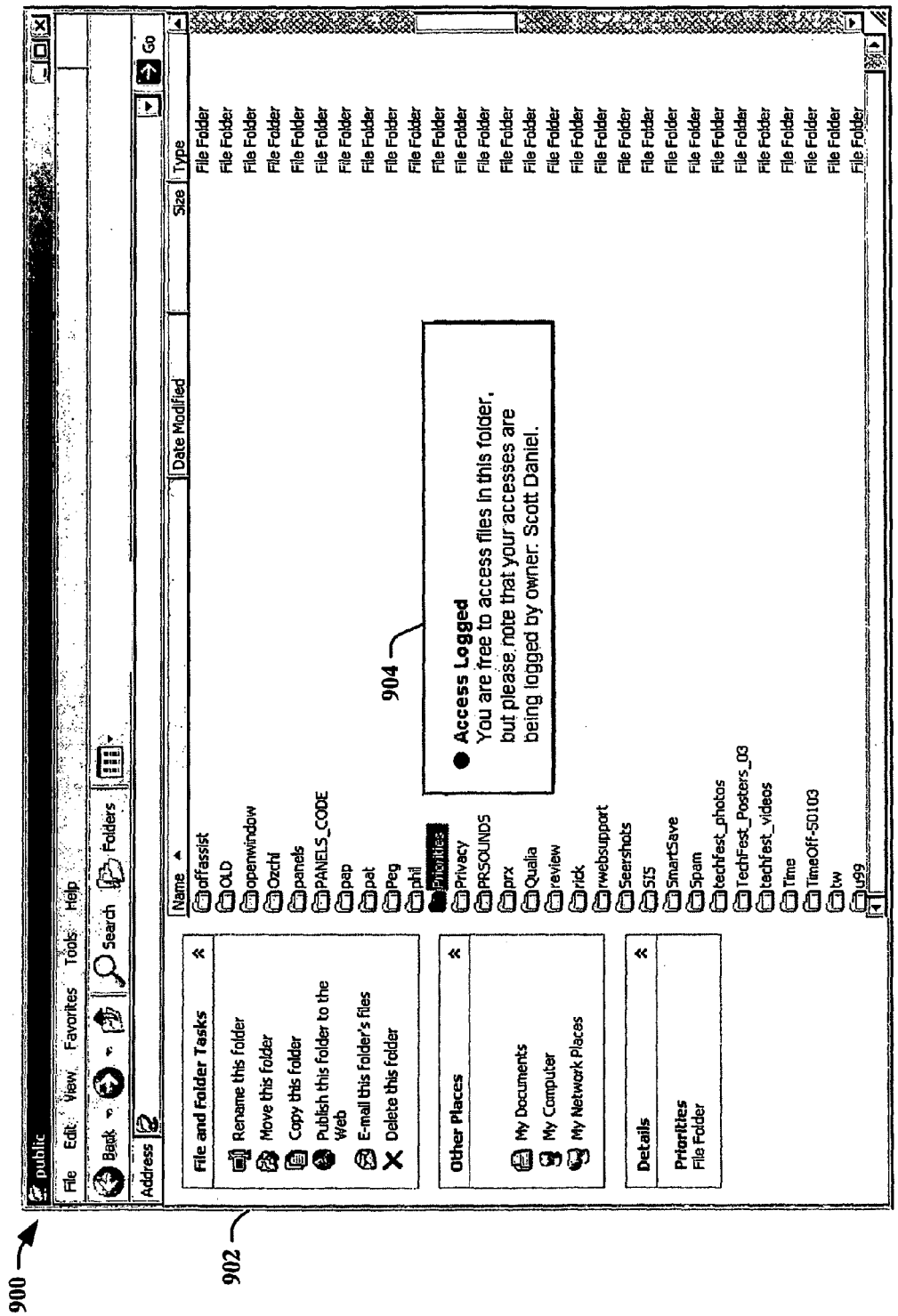
FIG. 9 is a screen shot of an information access requestor user interface in accordance with an aspect of the present invention.
Figure 10:
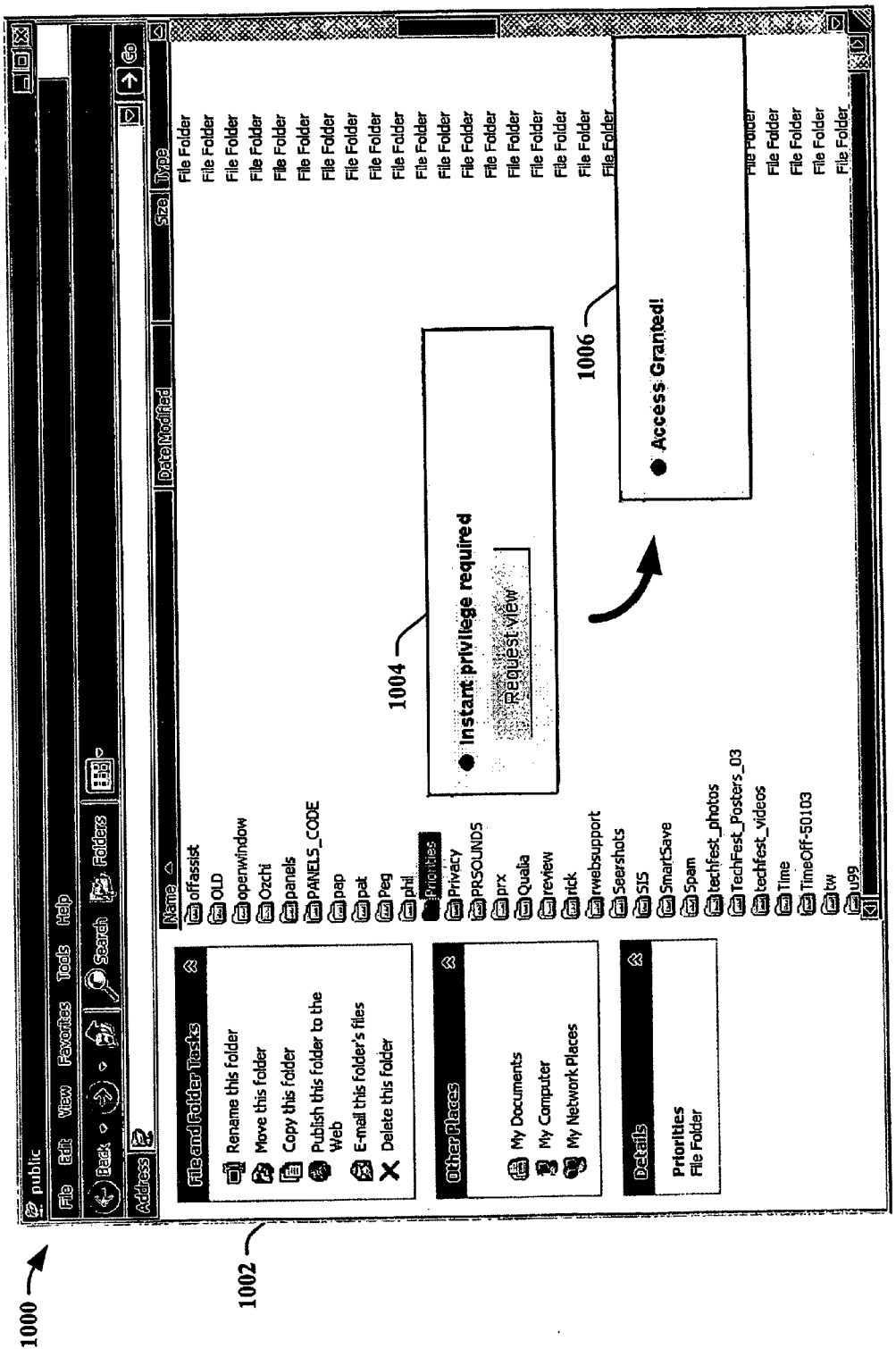
FIG. 10 is another screen shot of an information access requestor user interface in accordance with an aspect of the present invention.
Figure 11:
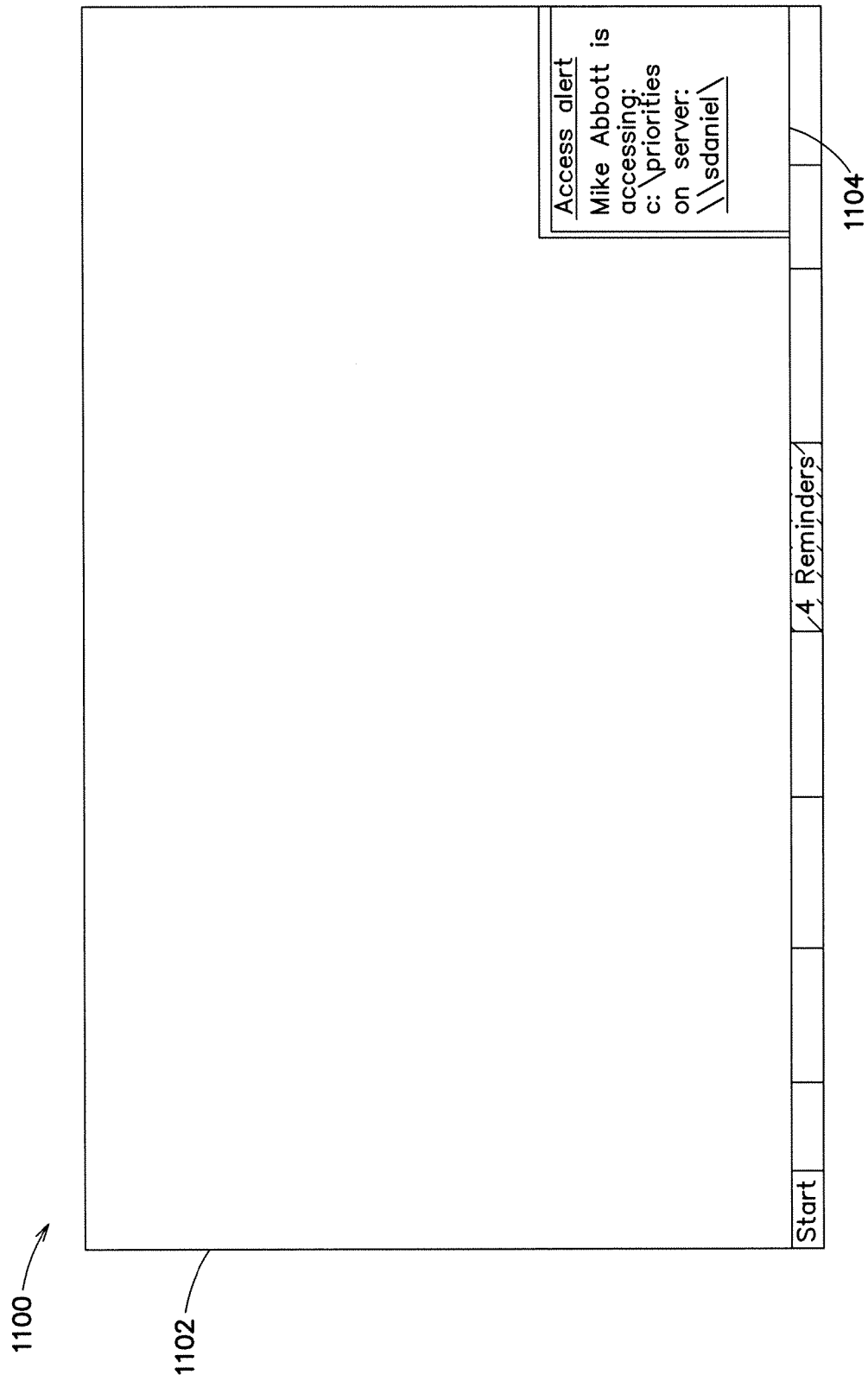
FIG. 11 is a screen shot of an information owner user interface in accordance with an aspect of the present invention.

In FIG. 9, a screen shot of an information access requestor user interface 900 in accordance with an aspect of the present invention is shown. The user interface 900 is comprised of a window 902 with a pop-up notification window 904. A user clicks on a file folder for access (e.g., "priorities") and is notified that the user's access to the folder is being logged and that they are free to access the files. In this instance of the present invention, the user is automatically granted access without a data owner's interaction. Referring to FIG. 10, another screen shot of an information access requestor user interface 1000 in accordance with an aspect of the present invention is depicted. In this user interface 1000, a request has once again been made to access a file folder via a window 1002. A first pop-up window 1004 indicates to the user that access privilege must be requested. Upon selection of requesting access, a second pop-up window 1006 indicates that access has been granted. Turning to FIG. 11, a screen shot of an information owner user interface 1100 in accordance with an aspect of the present invention is illustrated. This user interface 1100 shows what an owner of information can see when a user attempts to access the owner's information. A window 1102 representing a desktop window illustrates a pop-up notification window 1104 that alerts the information owner to the fact that their information is being accessed.

Figure 12:
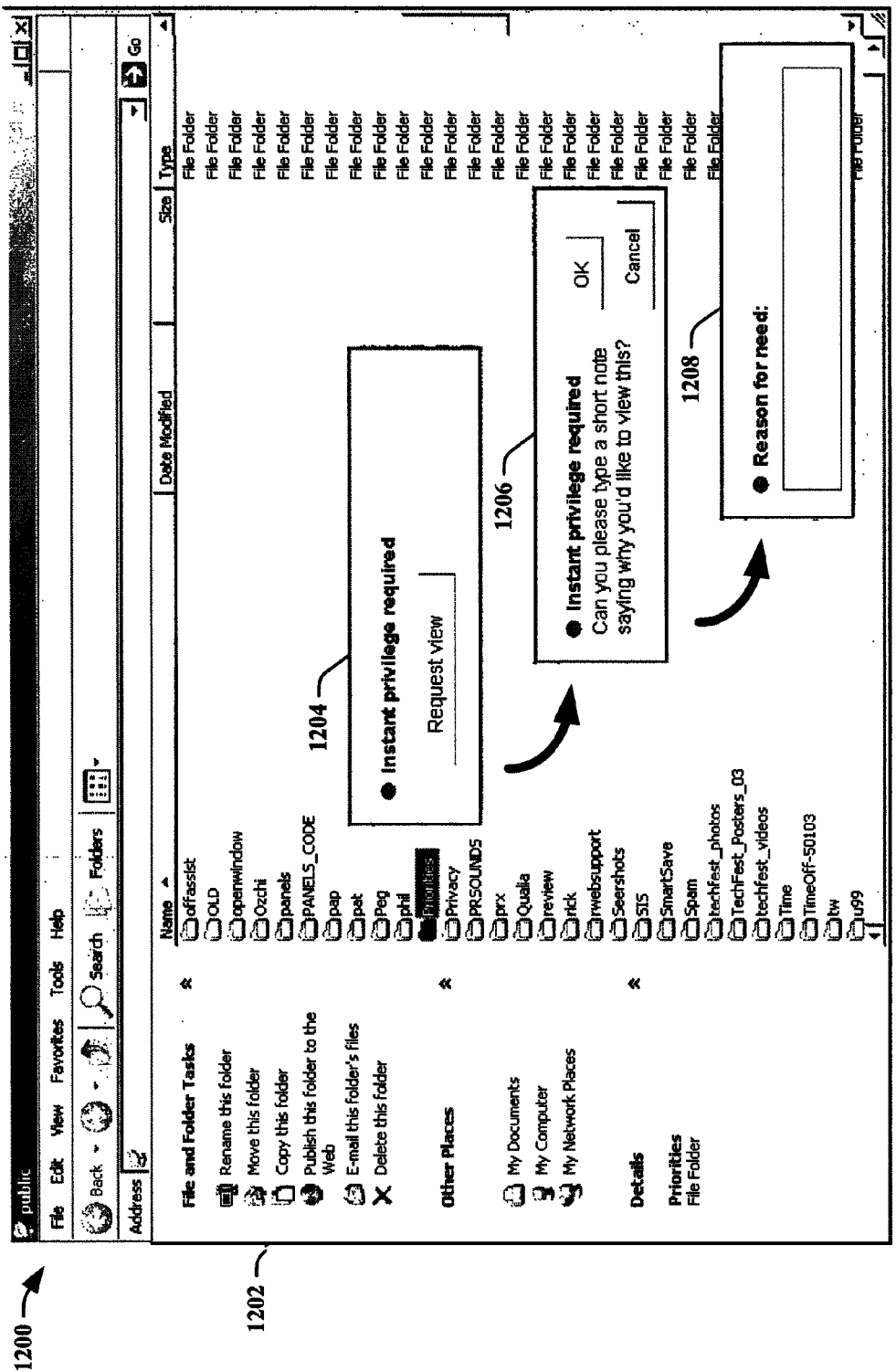
FIG. 12 is yet another screen shot of an information access requestor user interface in accordance with an aspect of the present invention.
Figure 13:
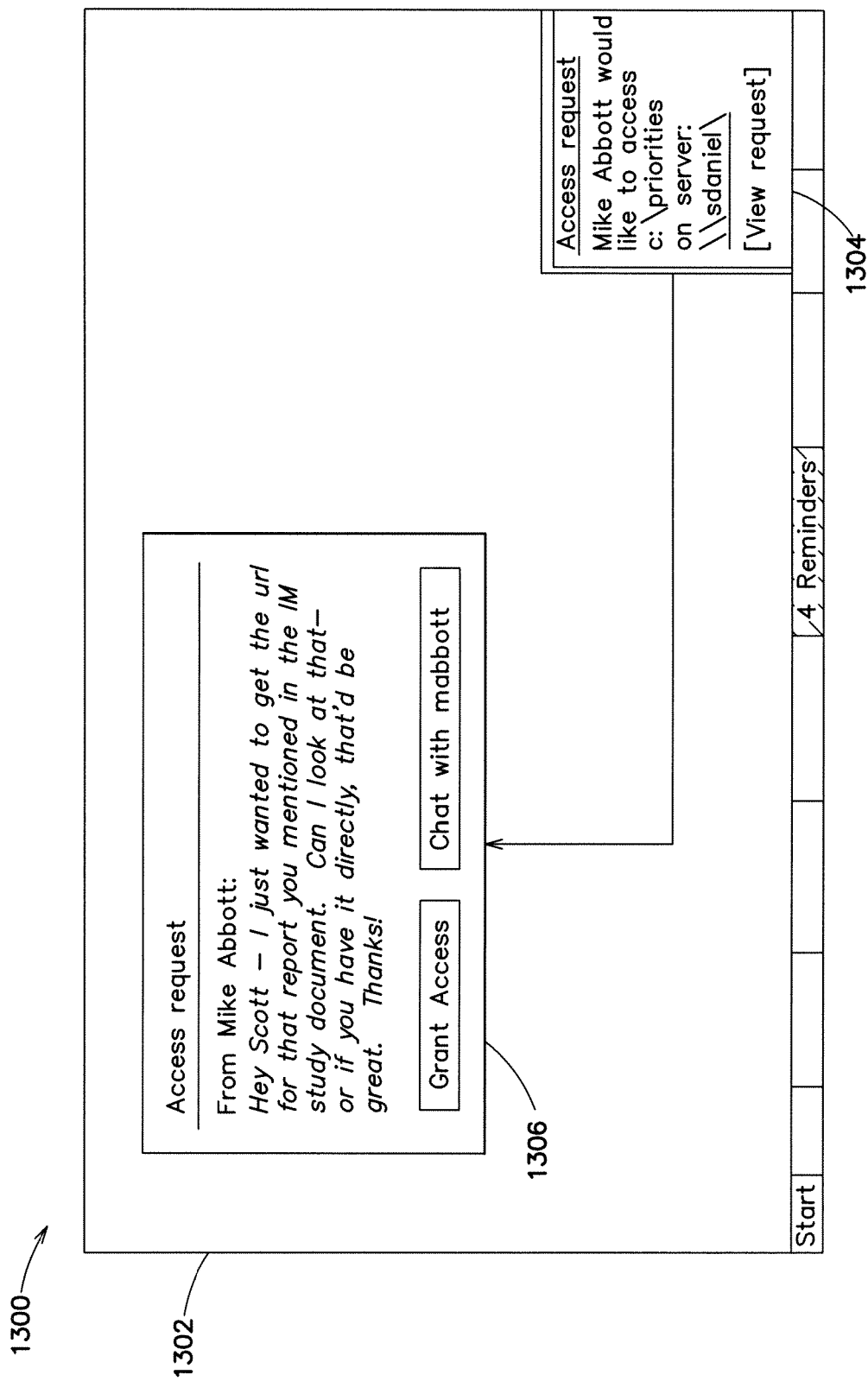
FIG. 13 is another screen shot of an information owner user interface in accordance with an aspect of the present invention.

Looking at FIG. 12, yet another screen shot of an information access requestor user interface 1200 in accordance with an aspect of the present invention is shown. This user interface 1200 illustrates a window 1202 with first 1204, second 1206, and third 1208 pop-up windows. When a user selects a file folder for access, the first pop-up window 1204 gives them notice that a request for access must be made. Upon selection to request access, a second pop-up window 1206 appears and further requires that a short reason be given via a third pop-up window 1208. This user interface 1200 allows a user to interact with the owner of the information that the user wants to access. It allows a user that might not typically be allowed access based upon a predetermined access policy to still be granted access, increasing the flexibility of the present invention. In FIG. 13, another screen shot of an information owner user interface 1300 in accordance with an aspect of the present invention is depicted. In this user interface 1300, a window 1302 representing a desktop has a first pop-up window 1304 and a second pop-up window 1306. When access is requested by a user, an information owner is notified via the first pop-up window 1304. The information owner can then select to view the user's access request and a second pop-up window 1306 appears showing the request. The second pop-up window 1306 also allows the information owner to grant access and/or interact real-time with the user requesting the access.

One skilled in the art will appreciate that the types of information conveyed by the supra user interfaces can be relayed to users of the interface in other manners and still be within the scope of the present invention. Thus, drop down menus, floating toolbars, symbology indicators, sensory alerts such as sound alerts and the like, and integrated indicators that are embedded into other programs are acceptable within the scope of the present invention. Likewise, communication between a requestor and an information owner can be accomplished via other communication means besides utilizing computational means. Thus, oral communication means such as telephones and cellular phones and the like can be employed along with emails, pop-up windows, chat methods, and instant messaging and the like.

Figure 14:
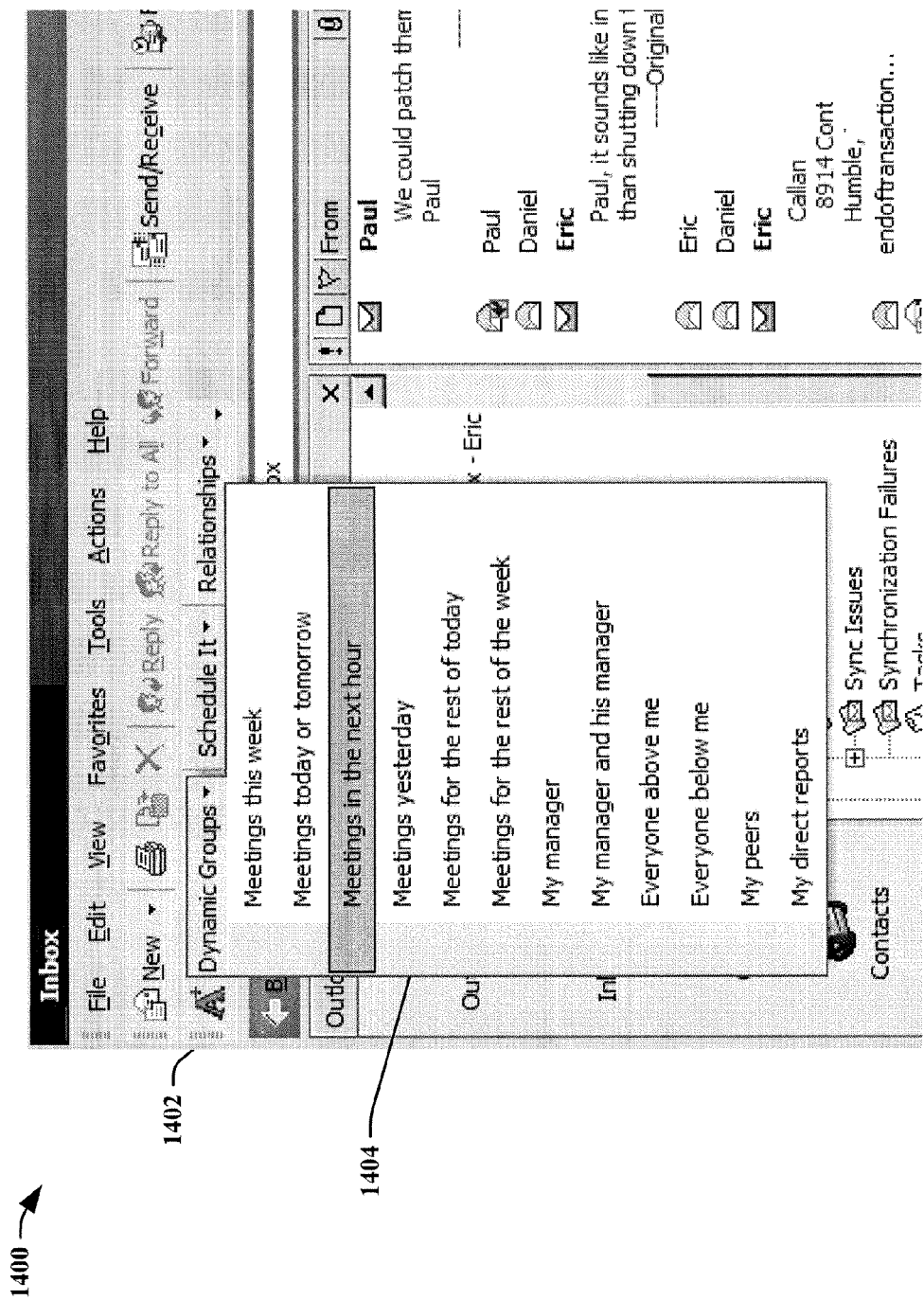
FIG. 14 is a screen shot of an information owner group selection user interface in accordance with an aspect of the present invention.
Figure 15:
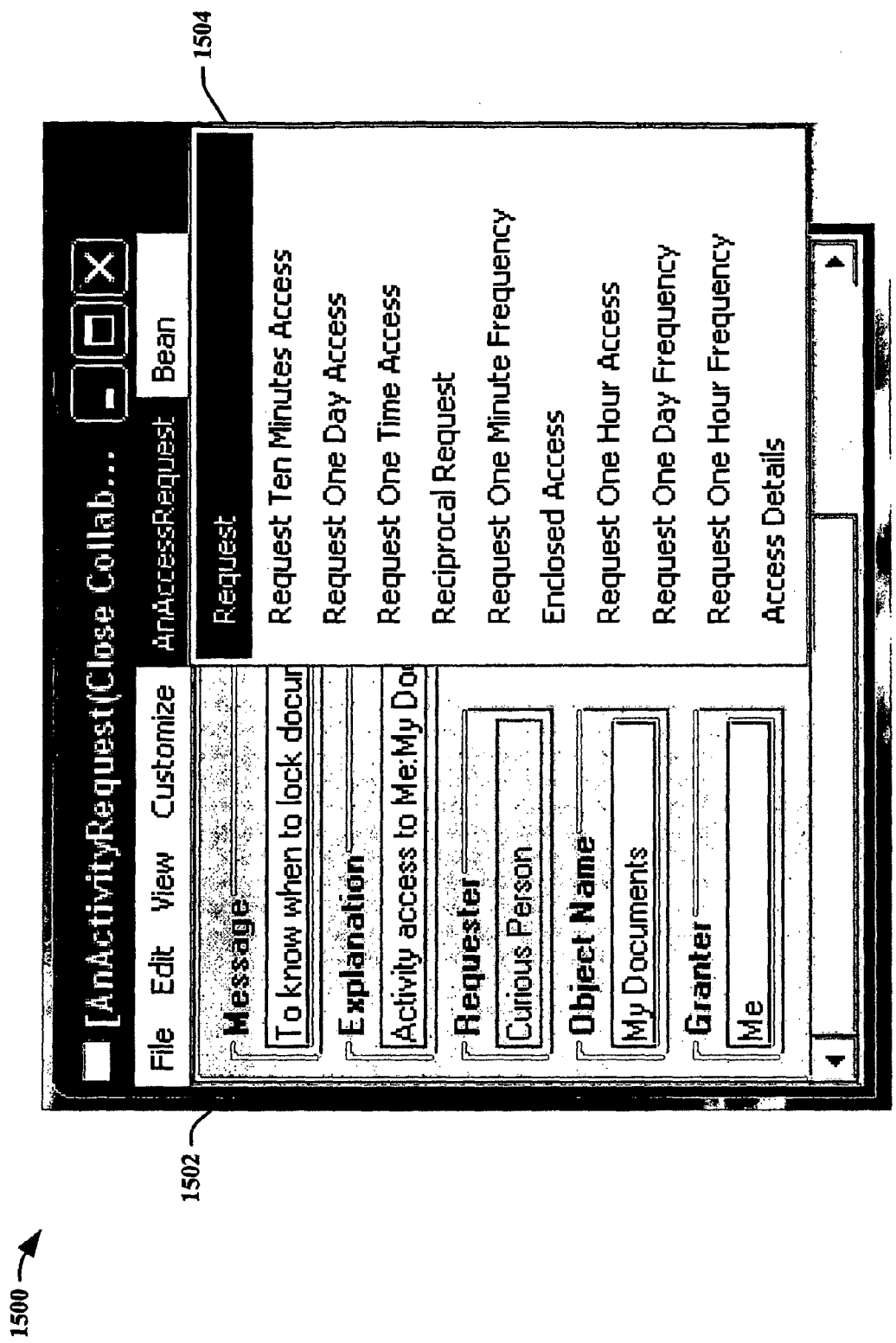
FIG. 15 is a screen shot of an information access request user interface in accordance with an aspect of the present invention.
Figure 16:
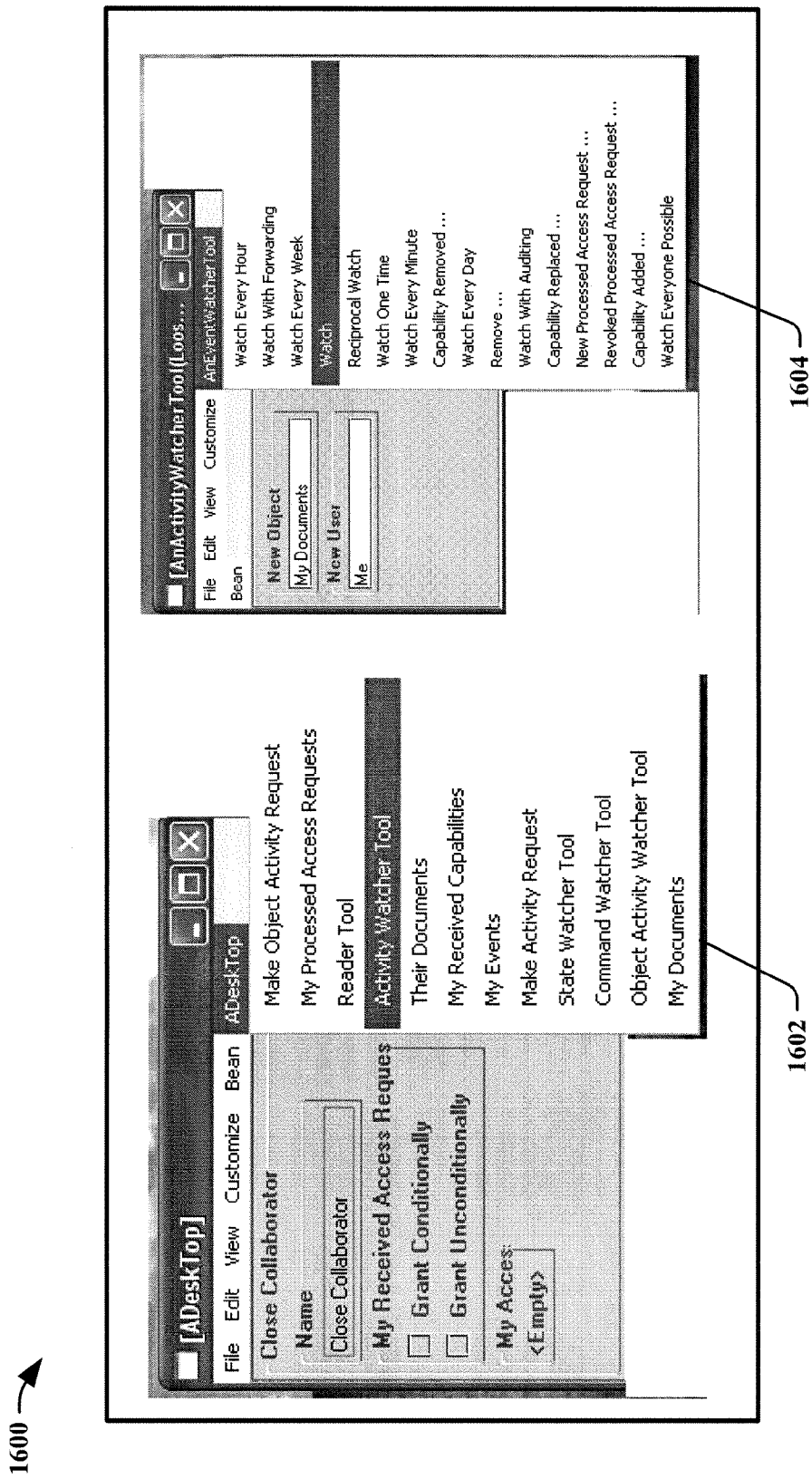
FIG. 16 is a screen shot of an information access activity user interface in accordance with an aspect of the present invention.
Figure 17:
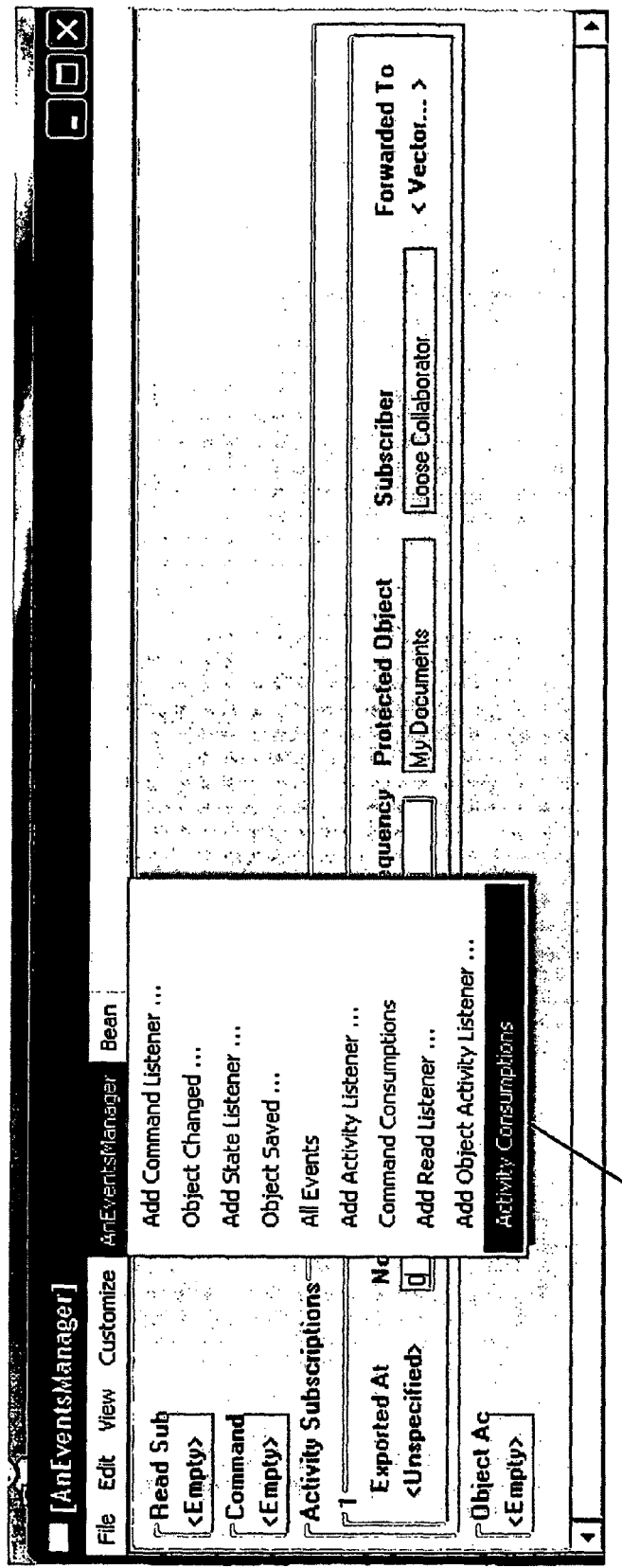
FIG. 17 is another screen shot of an information access activity user interface in accordance with an aspect of the present invention.

Referring to FIG. 14, a screen shot of an information owner group selection user interface 1400 in accordance with an aspect of the present invention is illustrated. This user interface 1400 shows a window 1402 that utilizes a drop-down menu 1404 to allow selection of dynamic groups by a data owner. This user interface 1400 permits the data owner to select various types of groups that are allowed to access data. For example, the data owner can choose meetings based on time proximity, choose people based on seniority, and/or choose people based on other collaboration parameters. Looking at FIG. 15, a screen shot of an information access request user interface 1500 in accordance with an aspect of the present invention is shown. In this user interface 1500 a user can select what type of access request they want to employ in a window 1502 with a drop down menu 1504. The user, for example, can request a time duration based request, a frequency based request, and/or a reciprocity based request. This user interface 1500 also allows the user to review further access details about the access request, such as additional permissions to copy, manipulate, and/or delete data and the like. Turning to FIG. 16, a screen shot of an information access activity user interface 1600 in accordance with an aspect of the present invention is depicted. In this user interface 1600, a data owner can activate various data watching tools to facilitate in monitoring access of their data. A first window 1602 allows the data owner to select an activity watcher tool. The second window 1604 allows the data user to select when, what and/or who to watch. In FIG. 17, another screen shot of an information access activity user interface 1700 in accordance with an aspect of the present invention is illustrated. The user interface 1700 allows a data owner to review an activity log that records activity events relating to accesses of their data. This allows information such as number of accesses, users who accessed, frequency of accesses, durations of accesses, and/or operations performed by the users during access and the like. Other instances of the present invention utilize user interfaces to set watch versus notification preferences, interface preferences, default access control preferences, access control agent preferences, automatic access control agent interaction preferences and the like.

Figure 18:
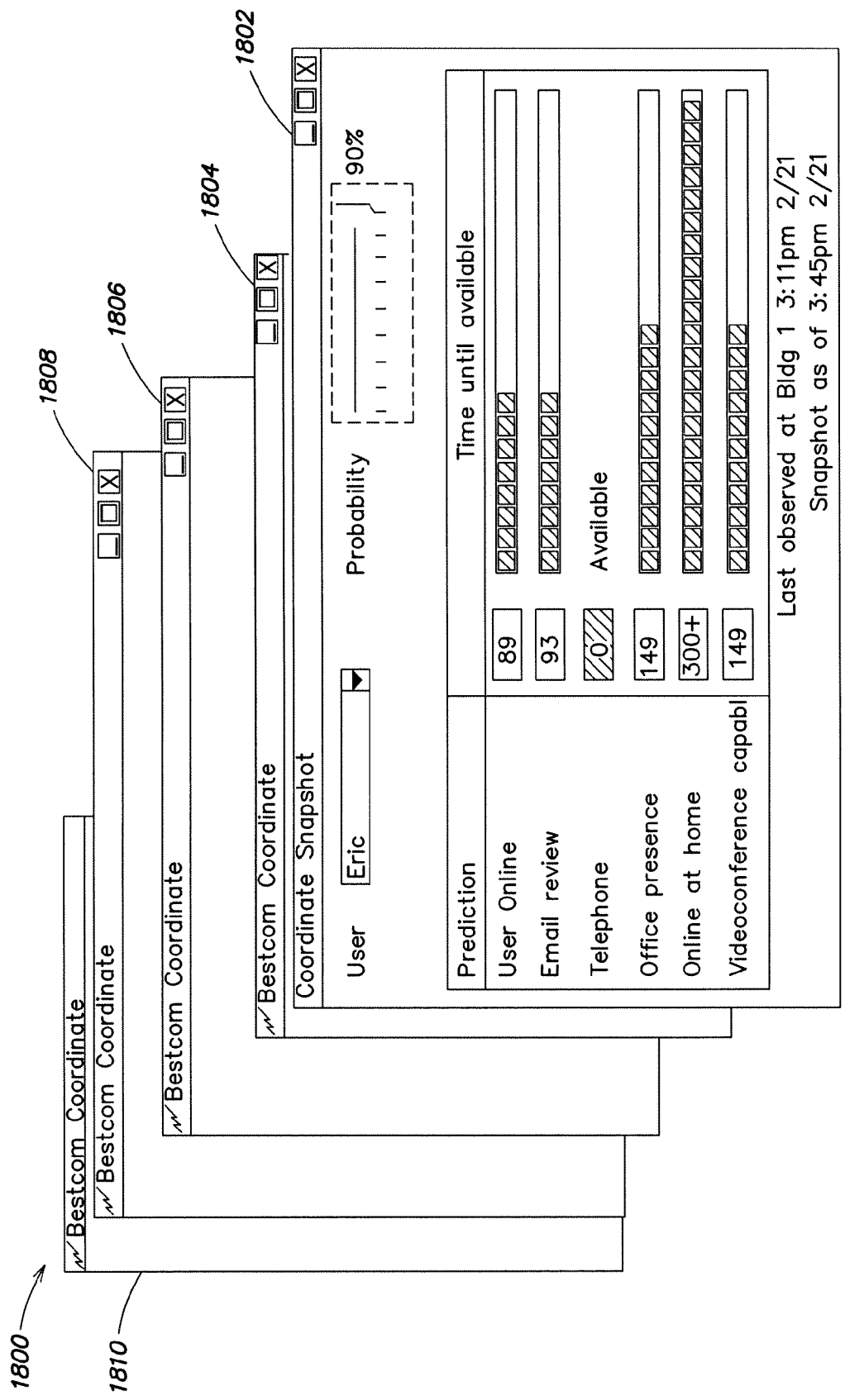
FIG. 18 is a group of screen shots relating to user availability and cost of interruption in accordance with an aspect of the present invention.

In FIG. 18, a grouping 1800 of screen shots relating to user availability and cost of interruption in accordance with an aspect of the present invention is shown. The grouping 1800 is comprised of screen shots 1802-1810 of Microsoft's Bestcom Coordinate tracking system. This permits utilization of inferred information to determine if the likelihood that a particular user will be in a certain location, is available for communication via various means, and/or is available based on a cost analysis schema for cost/benefit of interrupting and the like. This information is utilized by the present invention in determining such access policy aspects as manual versus automatic responses to access requests and time delays utilized in responding to access requests and the like. One skilled in the art can appreciate that although Microsoft's Bestcom Coordinate tracking system is depicted, any type of user tracking system can be employed by the present invention. This allows the present invention to utilize non-traditional information such as, for example, inference information relating to presence, location, and availability of a user that can be derived from inferential models.

One skilled in the art will appreciate that the supra user interfaces are only representative of the types of user interfaces within the scope of the present invention. The above examples are not meant to limit the present invention's scope but to illustrate the flexibility, ease-of-use, and level of control afforded to users of the present invention.

Figure 19:
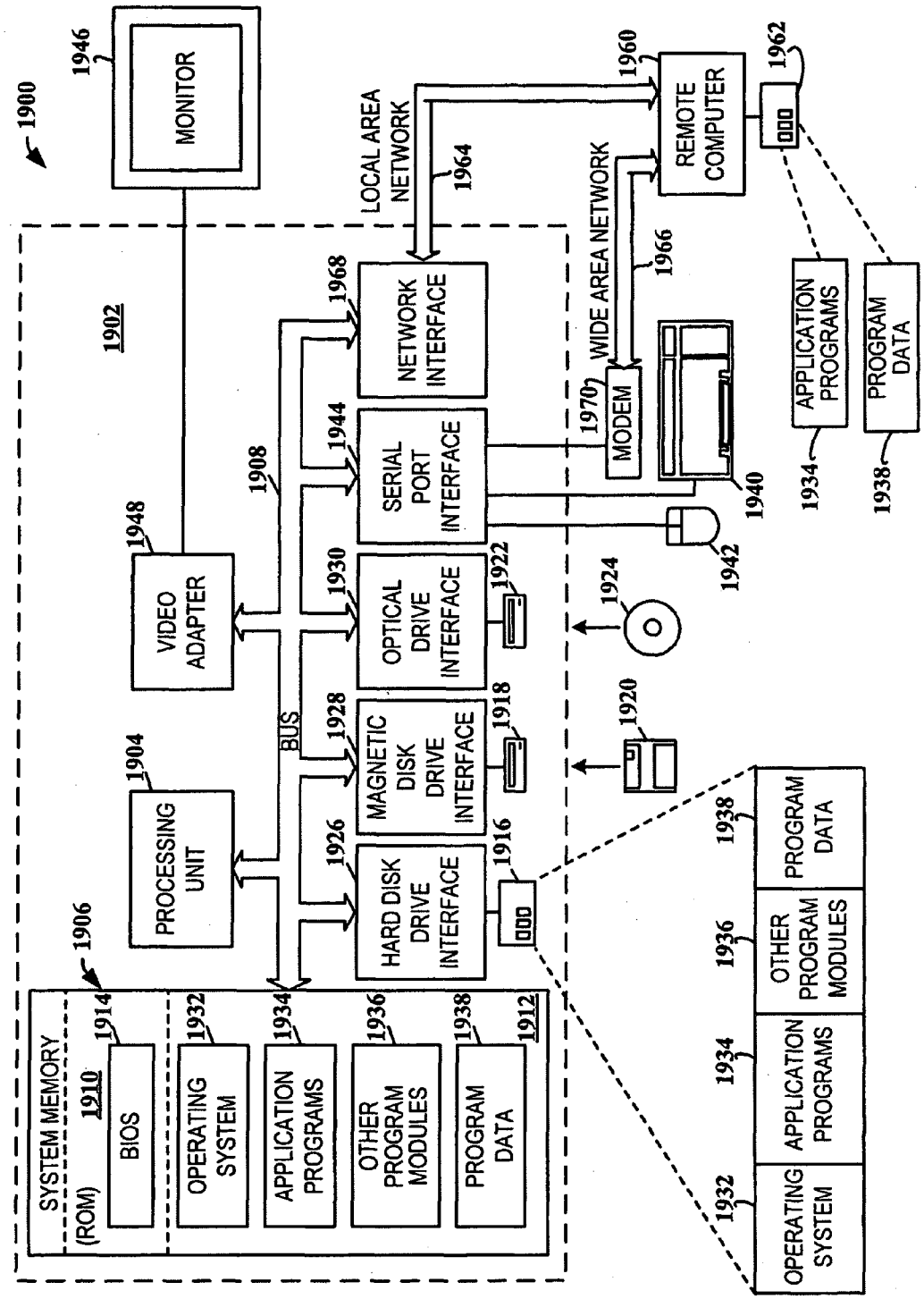
FIG. 19 illustrates an example operating environment in which the present invention can function.

In order to provide additional context for implementing various aspects of the present invention, FIG. 19 and the following discussion is intended to provide a brief, general description of a suitable computing environment 1900 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 19, an exemplary system environment 1900 for implementing the various aspects of the invention includes a conventional computer 1902, including a processing unit 1904, a system memory 1906, and a system bus 1908 that couples various system components, including the system memory, to the processing unit 1904. The processing unit 1904 may be any commercially available or proprietary processor. In addition, the processing unit may be implemented as multi-processor formed of more than one processor, such as may be connected in parallel.

The system bus 1908 may be any of several types of bus structure including a memory bus or memory controller, a peripheral bus, and a local bus using any of a variety of conventional bus architectures such as PCI, VESA, Microchannel, ISA, and EISA, to name a few. The system memory 1906 includes read only memory (ROM) 1910 and random access memory (RAM) 1912. A basic input/output system (BIOS) 1914, containing the basic routines that help to transfer information between elements within the computer 1902, such as during start-up, is stored in ROM 1910.

The computer 1902 also may include, for example, a hard disk drive 1916, a magnetic disk drive 1918, e.g., to read from or write to a removable disk 1920, and an optical disk drive 1922, e.g., for reading from or writing to a CD-ROM disk 1924 or other optical media. The hard disk drive 1916, magnetic disk drive 1918, and optical disk drive 1922 are connected to the system bus 1908 by a hard disk drive interface 1926, a magnetic disk drive interface 1928, and an optical drive interface 1930, respectively. The drives 1916-1922 and their associated computer-readable media provide nonvolatile storage of data, data structures, computer-executable instructions, etc. for the computer 1902. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1900, and further that any such media may contain computer-executable instructions for performing the methods of the present invention.

A number of program modules may be stored in the drives 1916-1922 and RAM 1912, including an operating system 1932, one or more application programs 1934, other program modules 1936, and program data 1938. The operating system 1932 may be any suitable operating system or combination of operating systems. By way of example, the application programs 1934 and program modules 1936 can include an information access control scheme in accordance with an aspect of the present invention.

A user can enter commands and information into the computer 1902 through one or more user input devices, such as a keyboard 1940 and a pointing device (e.g., a mouse 1942). Other input devices (not shown) may include a microphone, a joystick, a game pad, a satellite dish, wireless remote, a scanner, or the like. These and other input devices are often connected to the processing unit 1904 through a serial port interface 1944 that is coupled to the system bus 1908, but may be connected by other interfaces, such as a parallel port, a game port or a universal serial bus (USB). A monitor 1946 or other type of display device is also connected to the system bus 1908 via an interface, such as a video adapter 1948. In addition to the monitor 1946, the computer 1902 may include other peripheral output devices (not shown), such as speakers, printers, etc.

It is to be appreciated that the computer 1902 can operate in a networked environment using logical connections to one or more remote computers 1960. The remote computer 1960 may be a workstation, a server computer, a router, a peer device or other common network node, and typically includes many or all of the elements described relative to the computer 1902, although for purposes of brevity, only a memory storage device 1962 is illustrated in FIG. 19. The logical connections depicted in FIG. 19 can include a local area network (LAN) 1964 and a wide area network (WAN) 1966. Such networking environments are commonplace in offices, enterprise-wide computer networks, intranets and the Internet.

When used in a LAN networking environment, for example, the computer 1902 is connected to the local network 1964 through a network interface or adapter 1968. When used in a WAN networking environment, the computer 1902 typically includes a modem (e.g., telephone, DSL, cable, etc.) 1970, or is connected to a communications server on the LAN, or has other means for establishing communications over the WAN 1966, such as the Internet. The modem 1970, which can be internal or external relative to the computer 1902, is connected to the system bus 1908 via the serial port interface 1944. In a networked environment, program modules (including application programs 1934) and/or program data 1938 can be stored in the remote memory storage device 1962. It will be appreciated that the network connections shown are exemplary and other means (e.g., wired or wireless) of establishing a communications link between the computers 1902 and 1960 can be used when carrying out an aspect of the present invention.

In accordance with the practices of persons skilled in the art of computer programming, the present invention has been described with reference to acts and symbolic representations of operations that are performed by a computer, such as the computer 1902 or remote computer 1960, unless otherwise indicated. Such acts and operations are sometimes referred to as being computer-executed. It will be appreciated that the acts and symbolically represented operations include the manipulation by the processing unit 1904 of electrical signals representing data bits which causes a resulting transformation or reduction of the electrical signal representation, and the maintenance of data bits at memory locations in the memory system (including the system memory 1906, hard drive 1916, floppy disks 1920, CD-ROM 1924, and remote memory 1962) to thereby reconfigure or otherwise alter the computer system's operation, as well as other processing of signals. The memory locations where such data bits are maintained are physical locations that have particular electrical, magnetic, or optical properties corresponding to the data bits.

Figure 20:
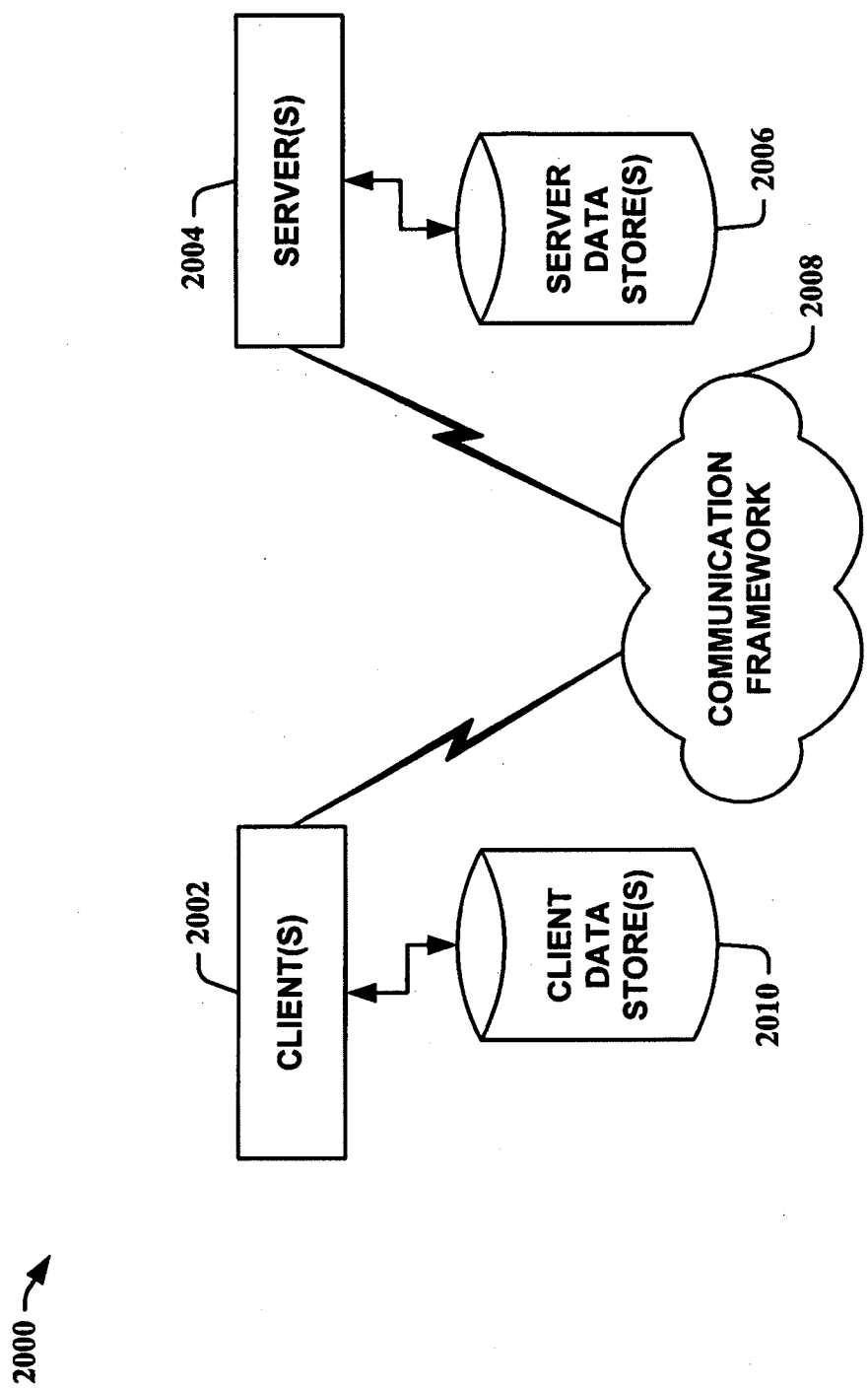
FIG. 20 illustrates another example operating environment in which the present invention can function.

FIG. 20 is another block diagram of a sample computing environment 2000 with which the present invention can interact. The system 2000 further illustrates a system that includes one or more client(s) 2002. The client(s) 2002 can be hardware and/or software (e.g., threads, processes, computing devices). The system 2000 also includes one or more server(s) 2004. The server(s) 2004 can also be hardware and/or software (e.g., threads, processes, computing devices). The server(s) 2004 can house threads to perform transformations by employing the present invention, for example. One possible communication between a client 2002 and a server 2004 may be in the form of a data packet adapted to be transmitted between two or more computer processes. The system 2000 includes a communication framework 2008 that can be employed to facilitate communications between the client(s) 2002 and the server(s) 2004. The client(s) 2002 are connected to one or more client data store(s) 2010 that can be employed to store information local to the client(s) 2002. Similarly, the server(s) 2004 are connected to one or more server data store(s) 2006 that can be employed to store information local to the server(s) 2004.

In one instance of the present invention, a data packet transmitted between two or more computer components that facilitates information access control is comprised of, at least in part, information relating to an information access control system that utilizes, at least in part, an access control process that facilitates access requests via utilization of at least one access policy based, at least in part, on at least one collaborative group of users and at least one content property associated with an access data item.

Data items within the context of the present invention can include, but are not limited to, data files, folders, directories, subdirectories, records, fields, documents, audio files, video files, calendars, mail messages, web pages, presence information, and conference history and the like. They also include non-traditional items such as, for example, inference information relating to presence, location, and availability of a user that can be derived from inferential models. A data item can also be a data element as small as, for example, one bit of data of a binary system and as large as, for example, a hard drive, multiple hard drives, entire servers, and entire data storage centers.

It is to be appreciated that the systems and/or methods of the present invention can be utilized in information access control facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system to facilitate information access control, comprising:
    memory; and
    one or more processors coupled to the memory and configured to:
        receive an access request for a data item owned by a data item owner, the access request being based on a request from a requesting user,
        determine whether the requesting user is a member of a dynamically created group of users based on an activity of the requesting user,
        dynamically select an access policy based on the dynamically created group of users to which the requesting user is determined to belong, and
        selectively provide access to the data item to the requesting user based on the access policy and further based on an urgency of the data item.

2. The system of claim 1, wherein the urgency of the data item is an inferred urgency of the data item.

3. The system of claim 1, wherein the urgency of the data item is a time urgency of the data item.

4. The system of claim 1, wherein the urgency of the data item is an inferred time urgency of the data item.

5. The system of claim 1, wherein the one or more processors are configured to dynamically select the access policy further based on a context of the data item owner; and
wherein the data item owner and the requesting user are not same.

6. The system of claim 5, wherein the one or more processors are configured to dynamically select the access policy based on communication means that are available for use by the data item owner.

7. The system of claim 5, wherein the one or more processors are configured to dynamically select the access policy based on an anticipated activity level of the data item owner.

8. The system of claim 5, wherein the one or more processors are configured to dynamically select the access policy based on an activity performed by the data item owner.

9. The system of claim 5, wherein the one or more processors are configured to dynamically select the access policy based on at least one of a location of the data item owner or an anticipated location of the data item owner.

10. The system of claim 5, wherein the one or more processors are configured to dynamically select the access policy based on a forecast of a wait time until the data item owner is able to act on the access request.

11. A method of facilitating information access control using at least one processor of a processor-based system, the method comprising:
receiving an access request for a data item owned by a data item owner, the access request being based on a request from a requesting user;
determining whether the requesting user is a member of a dynamically created group of users based on an activity of the requesting user;
dynamically selecting an access policy based on the dynamically created group of users to which the requesting user is determined to belong; and
selectively providing access to the data item to the requesting user based on the access policy and further based on an urgency of the data item.

12. The method of claim 11, wherein the urgency of the data item is an inferred urgency of the data item.

13. The method of claim 11, wherein the urgency of the data item is a time urgency of the data item.

14. The method of claim 11, wherein the urgency of the data item is an inferred time urgency of the data item.

15. The method of claim 11, wherein dynamically selecting the access policy comprises:
dynamically selecting the access policy further based on a context of the data item owner; and
wherein the data item owner and the requesting user are not same.

16. The method of claim 15, wherein dynamically selecting the access policy comprises:
dynamically selecting the access policy based on communication means that are available for use by the data item owner.

17. The method of claim 15, wherein dynamically selecting the access policy comprises:
dynamically selecting the access policy based on at least one of an anticipated activity level of the data item owner or an activity performed by the data item owner.

18. The method of claim 15, wherein dynamically selecting the access policy comprises:
dynamically selecting the access policy based on at least one of a location of the data item owner or an anticipated location of the data item owner.

19. The method of claim 15, wherein dynamically selecting the access policy comprises:
dynamically selecting the access policy based on a forecast of a wait time until the data item owner is able to act on the access request.

20. An article comprising a computer-readable storage medium that stores logic, the logic comprising:
means for determining whether a requesting user is a member of a dynamically created group of users based on an activity of the requesting user in response to receipt of an access request for a data item owned by a data item owner, the access request being based on a request from the requesting user;
means for dynamically selecting an access policy based on the dynamically created group of users to which the requesting user is determined to belong; and
means for selectively providing access to the data item to the requesting user based on the access policy and further based on an urgency of the data item.

* * * * *